(12) United States Patent
Kobler

(10) Patent No.: US 10,288,154 B2
(45) Date of Patent: May 14, 2019

(54) CONTINUOUSLY VARIABLE TRANSMISSION

(71) Applicant: U.M.S. Maschinenbau GmbH, Bad Woerishofen (DE)

(72) Inventor: Peter Kobler, Bad Woerishofen (DE)

( * ) Notice: Subject to any disclaimer, the term of this patent is extended or adjusted under 35 U.S.C. 154(b) by 0 days.

(21) Appl. No.: 15/054,614

(22) Filed: Feb. 26, 2016

(65) Prior Publication Data

US 2017/0241527 A1  Aug. 24, 2017

(30) Foreign Application Priority Data

Mar. 4, 2015  (DE) ........................ 10 2015 002 680

(51) Int. Cl.
| | |
|---|---|
| *F16H 57/04* | (2010.01) |
| *F16H 29/18* | (2006.01) |
| *F16H 29/16* | (2006.01) |

(52) U.S. Cl.
CPC ............ *F16H 29/18* (2013.01); *F16H 57/04* (2013.01); *F16H 57/043* (2013.01); *F16H 57/0424* (2013.01); *F16H 57/0467* (2013.01); *F16H 57/0471* (2013.01); *F16H 57/0487* (2013.01); *F16H 29/16* (2013.01)

(58) Field of Classification Search
None
See application file for complete search history.

(56) References Cited

U.S. PATENT DOCUMENTS

| | | | | |
|---|---|---|---|---|
| 2,677,968 | A * | 5/1954 | Hubner ................... | F16H 29/16 74/112 |
| 5,076,057 | A * | 12/1991 | Maruno ................... | F04B 1/113 417/221 |
| 5,081,963 | A * | 1/1992 | Galbraith ................ | F01L 1/34 123/188.5 |
| 5,085,053 | A * | 2/1992 | Hayashi ................. | B62M 19/00 60/487 |

(Continued)

FOREIGN PATENT DOCUMENTS

| | | |
|---|---|---|
| DE | 102009057292 | 6/2011 |
| DE | 102013008495 | 11/2014 |

(Continued)

OTHER PUBLICATIONS

Extended Search Report of the European Patent Office for EP Application No. EP20160157654; dated Feb. 24, 2017; 7 pages.

*Primary Examiner* — Justin Holmes
(74) *Attorney, Agent, or Firm* — Michael J. Gallagher; Luper Neidenthal & Logan, LPA

(57) ABSTRACT

The invention relates to a continuously variable transmission (10). The continuously variable transmission (10) comprises an outer rotary part (14), an inner rotary part (13) which is arranged in the outer rotary part (14) such that the inner and/or the outer rotary part (13, 14) are rotatable relative to one another, several coupling mechanisms (18) for coupling the inner and outer rotary part (13, 14) with one another, an adjustment device for eccentric adjustment of the inner and outer rotary part (13, 14) relative to one another and at least one first lubricant guiding device (220) for guiding at least (Continued)

Figure 1:
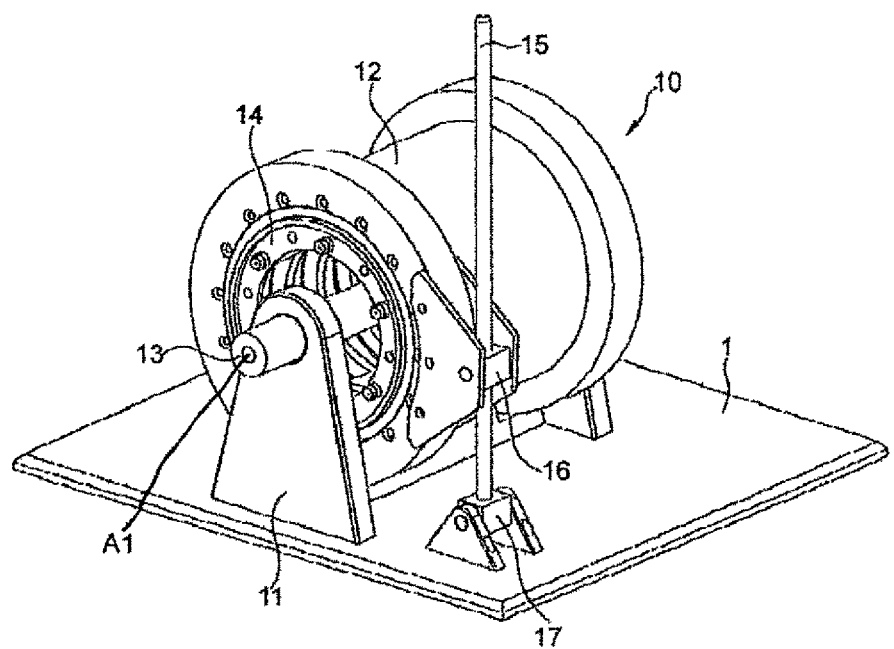

some of a lubricant from the shell surface of the inner rotary part (13) to a region of a coupling mechanism (18) lying radially further outwards with respect to the rotational axis of the inner rotary part (13).

11 Claims, 19 Drawing Sheets

(56) References Cited

U.S. PATENT DOCUMENTS

| | | | | |
|---|---|---|---|---|
| 5,492,026 | A * | 2/1996 | Olde Heuvel | ......... B62M 9/085 475/170 |
| 2009/0280018 | A1* | 11/2009 | Ichiyanagi | .......... F04C 18/0215 418/55.1 |

FOREIGN PATENT DOCUMENTS

| WO | WO2012105482 | 8/2012 |
|---|---|---|
| WO | WO2013128278 | 9/2013 |

* cited by examiner

CONTINUOUSLY VARIABLE TRANSMISSION

The invention relates to a continuously variable transmission. A transmission in which a rotational speed of a rotary part is converted into a rotational speed of another rotary part can also be constructed as a continuously variable transmission. In such a transmission the conversion ratio of the rotational speeds is continuously variable in a predetermined range. Continuously variable transmissions are known, for example, from DE 102 34 463 A1 or DE 36 05 211 A1, each of which, however, allow only low torques.

To solve this problem the inventor of the present application has developed a continuously variable transmission in which an outer rotary part or an inner rotary part can rotate around rotational axes which are parallel to one another and can be displaced eccentrically relative to one another. Such a continuously variable transmission is suitable for higher torques than in the prior art. However, there is the need here to optimise the continuously variable transmission for long-term operation or to increase its life.

The object of the present invention is therefore to provide a continuously variable transmission which solves the problems of the prior art. In particular, a continuously variable transmission in which high torques of the order of from approx. 100 Nm up to several mega-Nm in long-term operation are possible is to be provided.

The object is achieved by a continuously variable transmission having the features of claim 1. The continuously variable transmission comprises an outer rotary part, an inner rotary part which is arranged in the outer rotary part such that the inner and/or the outer rotary part are rotatable relative to one another, several coupling mechanisms for coupling the inner and outer rotary part with one another, an adjustment device for eccentric adjustment of the inner and outer rotary part relative to one another.

According to the invention the continuously variable transmission has at least one first lubricant guiding device for guiding at least some of a lubricant from the shell surface of the inner rotary part to a region of a coupling mechanism lying radially further outwards with respect to the rotational axis of the inner rotary part. This region of a coupling mechanism lying further outwards is therefore in particular not a region of a coupling mechanism lying closest to the inner rotary part.

By means of such a lubricant guiding device therefore preferably not only a region of a coupling mechanism which lies closest to the inner rotary part and which can preferably be supplied directly via a lubricant delivery means along the shell surface of the inner rotary part can be supplied with lubricant, but also a region of a coupling mechanism which lies radially further outwards than this region with respect to the rotational axis of the inner rotary part.

Particularly preferably, the region of a coupling mechanism lying further outwards is a peripheral joint or a bearing position of the coupling mechanism. In a substantially two-part configuration of a coupling mechanism this bearing position can be, for example, a so-called first bearing position between the two parts of the coupling mechanism, in which the two parts of the coupling mechanism are coupled to one another or supported via a so-called inner coupling bearing.

In a preferred embodiment the continuously variable transmission has a pump for delivering a lubricant into the transmission along a shell surface of the inner rotary part.

In a further preferred embodiment the continuously variable transmission has sealing elements which are arranged on the inner rotary part in the coupling mechanisms, or nozzles for delivering a predetermined amount of lubricant to the particular coupling mechanism.

Preferably, an annular gap is formed between the inner rotary part and one or each individual coupling mechanism, so that lubricant can flow along a shell surface of the inner rotary part.

Preferably, the first lubricant guiding device is a closed guiding device, so that lubricant can preferably be guided without loss from the shell surface of the inner rotary part to a region of a coupling mechanism lying radially further outwards with respect to the rotational axis of the inner rotary part.

Preferably, the first lubricant guiding device is at least partially, particularly preferably completely, within the coupling mechanism. Particularly preferably, the lubricant guiding device is realised by a bore in the coupling mechanism. Advantageously, a receiving opening of the lubricant guiding device is located between two bearing elements, preferably between two roller bearings, with the aid of which the coupling mechanism is supported at least partially on the inner rotary part. Preferably, a removal opening of the lubricant guiding device is provided at a bearing position of the coupling mechanism, which lies radially further outwards, with respect to the rotational axis of the inner rotary part, than the bearing of at least a part of the coupling mechanism on the inner rotary part. This, preferably first, coupling mechanism bearing position lying further outwards can thus also advantageously be supplied with lubricant from a lubricant flow along the shell surface of the inner rotary part.

Preferably, at least a part of the first lubricant guiding device is located outside the coupling mechanism of which at least one region lying further outside is to be supplied with lubricant. In this case the removal opening of the lubricant supply device can advantageously be located on a bearing element, preferably on a roller bearing element, with the aid of which at least a part of the coupling mechanism is supported on at least one other part of the coupling mechanism. Particularly preferably, the first lubricant guiding device here is guided through a sealing element which seals off from the interior of the outer rotary part, with respect to a loss of lubricant, the region of a coupling mechanism located further radially outwards, to which lubricant is to be fed. Advantageously, the first lubricant guiding device is arranged at least partially along an outer wall at least of a part of the coupling mechanism. Preferably, the first lubricant guiding device is at least partially, preferably substantially completely, configured as a tubular body, for example as a tube.

It would also be conceivable for two first lubricant guiding devices to be provided for guiding at least some of the lubricant from the shell surface of the inner rotary part to a region of a coupling mechanism lying radially further outwards with respect to the rotational axis of the inner rotary part, a first lubricant guiding device being provided in the inside of the coupling mechanism and the other first lubricant guiding device being located at least partially outside the coupling mechanism.

In a further preferred embodiment a first lubricant guiding device for guiding at least some of the lubricant from the shell surface of the inner rotary part to a region of a coupling mechanism lying radially further outwards with respect to the rotational axis of the inner rotary part is provided for each coupling mechanism.

In a further preferred embodiment at least one coupling mechanism has a second lubricant guiding device for guiding lubricant from a region of this coupling mechanism lying radially further outwards with respect to the rotational axis of the inner rotary part to a so-called second bearing position on which at least a part of the coupling mechanism is supported on the outer rotary part by means of an outer coupling bearing. Said region lying radially further outwards is preferably a first bearing position or the inner coupling bearing, on which particularly preferably in the case of a two-part configuration of the coupling mechanism at least one part of the coupling mechanism is supported on another part of the coupling mechanism.

It is conceivable here that a second lubricant guiding device can also be present independently of the presence of a first lubricant guiding device. Preferably, however, both a first and a second lubricant guiding device are present in at least one coupling mechanism.

Preferably, the second lubricant guiding device is also a closed guiding device, so that preferably lubricant can be guided substantially without loss from a region of a coupling mechanism lying radially further outwards to the second bearing position of the coupling mechanism.

Preferably, the second lubricant guiding device is located at least partially, particularly preferably completely, within the coupling mechanism. Particularly preferably, the lubricant guiding device is realised by a bore in the coupling mechanism. Advantageously, a receiving opening of the second lubricant guiding device is located in a bearing element of an inner coupling bearing at the first bearing position of the coupling mechanism. Particularly advantageously, the second lubricant guiding device here is passed through a sealing element of the inner coupling bearing. Such a sealing element here can be provided on the inner coupling bearing in order to seal this off from the interior of the outer rotary part with respect to a loss of lubricant. Advantageously, a removal device of the second lubricant guiding device is located between two bearing elements of the second bearing position, that is to say the outer coupling bearing, by means of which at least a part of the coupling mechanism is supported on the outer rotary part.

Preferably, at least a part of the second lubricant guiding device is located outside the coupling mechanism, front which the second bearing position is to be supplied with lubricant. In this case the removal opening of the lubricant supply device can advantageously be located on a bearing element, preferably on a roller bearing element, with the aid of which at least a part of the coupling mechanism is supported on the outer rotary part. Advantageously, the second lubricant guiding device is arranged alt least partially along an outer wall at least of a part of the coupling mechanism. Preferably, the second lubricant guiding device is configured at least partially, preferably substantially completely, as a tubular body, for example as a tube.

Preferably, all the coupling mechanisms of the continuously variable transmission have a second lubricant guiding device, particularly preferably in addition to a first lubricant guiding device.

Preferably, no sealing element which is to prevent an exit of lubricant from the outer coupling bearing into the interior of the outer rotary part is arranged on an outer coupling bearing of a coupling mechanism, which has been designated above as the second bearing position and at which, as described above, at least a part of a coupling mechanism is supported on the outer rotary part. On the contrary, such an exit of lubricant into the interior of the outer rotary part is even desirable, in order namely to render possible an outflow of the lubricant and therefore a transporting away of any particles of dirt from the coupling bearing.

Particularly preferably, in the case of an at least two-part form of a coupling mechanism an inner coupling bearing, which has been designated above as the first bearing position and at which at least first part of the coupling mechanism is supported on an at least second part of the coupling mechanism, has at least one sealing element, preferably two sealing elements and particularly preferably sealing rings, through which any exit of lubricant from the inner coupling bearing into the interior of the outer rotary part can be prevented.

With the continuously variable transmission, a smooth-running operation of the continuously variable transmission can be realised even at high rotational speeds and/or torques. Furthermore, the life of the continuously variable transmission is improved compared with the configurations of the prior art to date.

By a light-weight and inexpensive configuration of the transmission, furthermore, the operating properties can be improved and the production costs lowered.

Advantageous further configurations of the invention are described in the dependent claims.

In one advantageous embodiment the continuously variable transmission furthermore comprises a housing for accommodating the continuously variable transmission, wherein particularly preferably the pump for delivering the lubricant is arranged in a circulation into and/or from the housing.

According to a further advantageous variant the outer rotary part has discs spaced apart by bearing bolts for the coupling mechanisms.

According to a further advantageous embodiment the outer rotary part has two casings fixed to one another, which are spaced apart by bearing bolts for the coupling mechanisms.

In a further advantageous embodiment of the continuously variable transmission one of the coupling mechanisms has an inner coupling module which is arranged on the inner rotary part and an outer coupling module which is arranged on the outer rotary part, wherein particularly preferably the inner coupling module has a mass balancing bolt for balancing a mass of a bearing bolt of at least one coupling module, preferably just one coupling module and particularly preferably the inner coupling module or the outer coupling module, with which bearing bolt the inner and outer coupling module can be fixed to one another rotatably/pivotably, similarly to a knee joint.

Preferably, a coupling mechanism of the continuously variable transmission, as already described above, has an inner coupling bearing which is designated the first bearing position and at which the inner coupling module is supported on the outer coupling module. Analogously to this, the outer coupling module is preferably supported by the outer coupling bearing at the second bearing position on the outer rotary part. A first lubricant guiding device can thus preferably be provided within and/or on the outer wall of an inner coupling module, and a second lubricant guiding device can advantageously be provided within and/or on the outer wall of an outer coupling module.

Furthermore, in a further advantageous embodiment the inner coupling module has at least one slot for receiving carbon fibres wound by lamination with pretension.

In a further advantageous embodiment the inner rotary part has at least one wound metal sheet. Particularly preferably, the at least one wound metal sheet is arranged here in a tube.

In the continuously variable transmission, in a further advantageous embodiment a lower end of a sprag is concave in construction, the sprag serving to support one of the coupling mechanisms on the inner rotary part. By this construction the life can be increased, since even with a certain removal of material by wear a reliable contact with the sprag still exists. Preferably, the correspondingly other contact surface of the sprag located at the upper end of the sprag is convex in construction.

Preferably, the inner contact surface, that is to say the contact surface of the sprag in the direction of the inner rotary part, is concave in construction and the outer contact surface, that is to say the contact surface of the sprag in the direction of the outer rotary part, is convex in construction. Preferably, the course of at least one contact surface can follow a logarithmic spiral.

Furthermore, in a further advantageous embodiment of the continuously variable transmission a bearing position for an adjusting element of the adjustment device is arranged in the axial direction centrally on a bearing and guiding module, which serves to support the outer rotary part.

In a further advantageous embodiment the outer and inner coupling module can be swiveled by an angle with respect to one another, and particularly preferably this angle is always less than 180°. By this means the coupling mechanism cannot fold over.

Preferably, the geometric connection between the middle point of the inner rotary part and a first linkage of the inner coupling module on the one hand and the geometric connection between the first linkage of the inner coupling module and a second linkage of the outer coupling module on the other hand enclose an angle which is less than 180°, preferably less than 179°, 178°, 177°, 176° or 175°. Preferably, the angle just mentioned is, advantageously additionally to the above maximum limit, greater than 20° and particularly preferably greater than 30°. In this context the articulated axis at which the inner and the outer coupling module are connected pivotably to one another, for example a bearing bolt, preferably corresponds to the first linkage of the inner coupling module, and particularly preferably the bearing which serves as an inner bearing for the outer coupling module and as an outer bearing for the inner coupling module corresponds to the first linkage of the inner coupling module. The second linkage of the outer coupling module preferably corresponds to the bearing which serves as an outer bearing for the outer coupling module.

In a further advantageous embodiment the eccentricity of the coupling mechanism and/or of the outer rotary part relative to the inner rotary part and/or the pivotability is limited with the adjustment device with stops. Preferably, this is effected by stops in the coupling mechanism, particularly preferably by a limitation of the relative pivotability between the inner and outer coupling module.

In a further advantageous embodiment the eccentricity of the coupling mechanism between the housing and a bearing and guiding module which serves to support the outer rotary part is limited by stops.

In a further advantageous embodiment stops of the coupling mechanism are formed in the articulated axes from an outer bearing for the outer coupling module and/or from a bearing which serves as an inner bearing for the outer coupling module and as an outer bearing for the inner coupling module.

In a further advantageous embodiment the outer bearing for the outer coupling module and the other bearing which serves as an inner bearing for the outer coupling module and as an outer bearing for the inner coupling module each comprise in each case two parts, which are preferably configured as two bearings which are connected with one another rotatably or rigidly.

By a coupling mechanism of such a configuration the sinus function of a movement of the coupling mechanism is deformed such that it approaches the ideal of a rectangular function. As a result a uniform rotary movement is obtained at the output drive.

Preferably, the inner and outer coupling modules move not around one pivotal point but around two pivotal points. Particularly preferably, the angle between the two parts of the outer bearing and of the other bearing is in each case constant.

In a further advantageous embodiment an oscillation generator having a differential transmission is interconnected in the continuously variable transmission. Preferably, this is realised by a planetary transmission. Particularly preferably, in this the ratio of the rotational speed of the sun wheel, which is preferably connected to the output drive of the oscillation generator, to the ring gear is 5:1. Preferably, an oscillation generator is understood as meaning the inner or the outer rotary part or the coupling mechanism(s).

In a further advantageous embodiment a lubricant stream exists in the axial direction along the shell surface of the inner rotary part. Particularly preferably, a lubricant supply is provided between the inner rotary part and the coupling mechanisms, advantageously between the inner rotary part and the inner coupling module(s).

Preferably, an active lubricant supply without controlled loss of lubricant can be provided. In this context the lubricant or oil flow is preferably guided in a manner in which sealing rings are arranged between the two connecting pieces of the fixed housing lid, which are preferably arranged displaced with respect to one another in the axial direction of the rotational axis of the outer rotary part and between which the coupling mechanisms are advantageously located, and the clutch levers or coupling mechanisms lying in between are mounted such that no uncontrolled exit of lubricant or oil is possible. The liquid lubricant is thus preferably pumped or delivered starting from a housing lid along the shell surface, particularly preferably of the inner rotary part, through the inner coupling mechanism in the direction of the second housing lid. Finally, the lubricant or the oil can preferably run over the support of the inner rotary part by means of an overflow bore into the transmission housing and be collected.

Additional bearing positions can preferably be supplied with lubricant directly via a separate lubricant or oil line from the lubricant or oil pump. As additional measures spray nozzles which spray into the inside of the transmission and supply all the functional parts with lubricant can be mounted in a fixed position on the housing. In this variant of a lubricant supply the inner and outer bearing of the coupling mechanism are thereby not yet supplied directly with lubricant or oil. An indirect lubrication thus takes place via oil feed bores in the support.

The applicant has now discovered in exhaustive test series that the lubricant or oil supply of the support of the coupling mechanisms is effected particularly advantageously directly starting from the lubricant supply of the shell region of the inner rotary part. A connection is preferably established between the bore of the clutch lever or of the inner coupling module and the first bearing position, and between the first bearing position and the second bearing position in the form of a bore and/or channel, preferably of the outer coupling module. The centrifugal force of the rotating coupling mechanism transports the lubricant or the oil from the annular gap between the inner rotary part and bore of the clutch lever or inner coupling module to the bearing positions as desired. The advantage of this measure lies in an outstanding lubricant supply and cooling, and the transporting away of particles formed due to wear. The support in question can be open, for example equipped with lubricant- or oil-guiding grooves, and/or preferably provided with seals. It is advisable to seal off the first bearing position and preferably to configure the second bearing position as "open". This means that the oil delivered or the lubricant delivered can advantageously first exit at the second bearing position.

Nozzles which supply the functional elements, such as e.g. the support of the outer rotary part and/or gear wheels or chains, with lubricant in a targeted manner can preferably additionally be mounted.

In one variant of a lubricant supply a passive lubricant supply with controlled oil loss is used. In this context the individual coupling mechanisms are not equipped with sealing rings, and oil thus exits in a controlled manner between the clutch levers, or the inner coupling modules, and the housing lids into the inside of the outer rotary part and passively lubricates the coupling mechanisms, the bearing positions of which do not have lubricant bores. These are as a rule relatively small, as a result of which a low oil throughput is possible.

In order to get more lubricant into the bearing positions, the applicant has discovered that fixing of funnel-shaped elements on the lubricant bore, preferably on all openings of the lubricant bores, is advantageous, so that a higher lubricant throughput becomes possible. Preferably, the funnel-shaped elements here are aligned in the radial direction to the rotational axis of the inner rotary part, so that the funnel-shaped elements in each case have a largest possible cross-sectional area with respect to the lubricant particles accelerated tangentially from the shell surface of the inner rotary part into the inside of the outer rotary part due to the centrifugal force. Preferably, such a funnel-shaped element can advantageously be realised via a lowering of the lubricant bore and/or a channel or a (wide) groove which extends on the surface of the bearing position up to the lubricant bore.

It is also possible to transfer the lubricant supply according to the invention to conventional continuously variable transmissions.

In a further preferred embodiment the continuously variable transmission has a lubricant or oil pump for sucking up the lubricant from a lubricant or oil sump and for delivering the lubricant along the shell surface of the inner rotary part.

Preferably, this pump is preceded by a lubricant or oil filter. The applicant reserves the right also to claim this invention in the context of a divisional application.

Particularly preferably, in an operating state of the continuously variable transmission the pump is arranged or fixed on the underside of the transmission housing, which is advantageously elongated and cylindrical. When the transmission is aligned horizontally the oil supply functions because the lubricant in the sump can be sucked in. If the transmission is swiveled such that the input drive shaft and output drive shaft are vertical, the lubricant or oil sump aligns itself according to gravity. There is then the danger that the pump sucks in air and the lubricant supply fails.

This can preferably be counteracted by positioning the intake bore under the lubricant or oil sump and mounting the lubricant or oil filter and/or lubricant or oil pump underneath. Preferably, a removal of lubricant from the lubricant sump is thus possible.

The applicant reserves the right also to claim this invention in the context of a divisional application.

Another preferred possibility is to position a lubricant or oil line having a foot valve in the sump region, that is to say preferably under the lubricant sump, and to connect it to the oil pump with the suction side. Sucking in of air is thus preferably prevented. The position of the lubricant or oil filter and lubricant or oil pump therefore plays a minor role.

The applicant reserves the right also to claim this invention in the context of a divisional application.

Preferably, at least a part of the lubricant line has magnets between the lubricant sump and the lubricant pump which are suitable and provided for binding out of the lubricant flowing through the lubricant line, and therefore removing from the lubricant flowing into the pump, particles which are caused by wear and produced and separated out during operation of the transmission. An oil drain plug which can be equipped with magnets or can be made of magnetic material in order to bind particles which are separated out due to wear during operation of the transmission is preferably provided for this. Furthermore, a lubricant or oil filter which filters out the non-magnetic particles from the lubricant or oil circulation is preferably provided.

The applicant reserves the right also to claim this invention in the context of a divisional application.

Preferably, the inner coupling modules of the coupling mechanisms arranged in succession in the axial direction of the inner rotary part are separated from one another by screen-like or net-like elements. The individual sprags can thus preferably also be separated from one another by these elements. Preferably, the screen-like or net-like elements are annular in configuration and arranged on the inner rotary part so that they encompass this completely. Particularly preferably, a screen-like or net-like element or a screen disc is in each case arranged between a sprag and a bearing element (for supporting the inner coupling module on the inner rotary part) and/or between a bearing element of an inner coupling module of a coupling mechanism and the bearing element of an inner coupling module of the adjacent coupling mechanism.

The clutch levers (inner coupling modules) arranged in succession, in particular of identical construction, in this context can preferably be provided with screen discs in their annular section in order to separate the rows of sprags and radial bearing from one another. Larger particles, e.g. flakes, can be held up, preferably by these screen-like or net-like elements or screen discs, through the current caused in the lubricant or oil flow and can cause no damage in the adjacent clutch lever.

The applicant reserves the right also to claim this invention in the context of a divisional application.

Preferably, the flow speed of the lubricant through a lubricant or oil pump driven externally can be generated e.g. electrically. The lubricant or oil pump can particularly preferably also be driven directly by the rotary parts of the transmission.

Preferably, the continuously variable transmission has a gear lubricant or oil pump. Particularly preferably, the flow speed of the lubricant is generated by means of a gear lubricant or oil pump. It has been found namely that in the preferred embodiment of the continuously variable transmission no forced-feed lubrication is necessary, but preferably merely a (low) volume stream of the lubricant must be provided. Advantageously, in this context the gear lubricant or oil pump is realised with system components already present in the continuously variable transmission, such as toothed wheel transmission means. Particularly advantageously, a crown gear of the outer rotary part is employed as a gear wheel for a gear lubricant or oil pump, a second gear wheel of the gear lubricant or oil pump being a gear wheel which is employed on the output drive side of the continuously variable transmission, connected to the output drive shaft. By the use of these gear wheels in a gear lubricant or oil pump these are lubricated at the same time, as a result of which friction is reduced.

A device which completely encloses the engagement region of the teeth of the two gear wheels above and below is preferably attached to the pivoting housing. Preferably, the device here does not enclose one of the two or also both gear wheels completely. In the vicinity of the engagement region of the two gear wheels a bore is preferably set radially above and/or below the engagement region and particularly preferably connected to the sump and oil pump (pressure side). Lubricant can thus preferably be passed by the position of engagement of the teeth of the two gear wheels. The functioning principle is based on that of a gear pump. Before the teeth which are engaged a reduced pressure arises, which sucks the lubricant or the oil out of the sump. After the engagement of the teeth an increased pressure arises, which as already known reliably supplies the system components with lubricant. Apart from gear pumps, wing, piston, membrane pumps can also advantageously be employed.

The applicant reserves the right also to claim this invention in the context of a divisional application.

In a preferred embodiment the inner coupling module is configured such that it acts as a two-sided lever. The fulcrum of the two-sided lever here is the pivotal point of the inner coupling module. This preferably lies on the rotational axis of the inner rotary part. A first lever arm here is preferably given by that part of the inner coupling module which extends starting from the pivotal point of the inner coupling module to the inner coupling bearing (to the first bearing position) or to the outer coupling module. The second lever arm of the inner coupling module is preferably the counter-weight to the first lever arm of the inner coupling module.

Preferably, the second lever arm of the inner coupling module is constructed such that the torque on the side of the first lever arm of the inner coupling module is in equilibrium with the torque on the side of the second lever arm. In this context, on both lever arms preferably only their masses, but not forces additionally acting, should be taken into consideration. Particularly preferably, in this context in the case of the first lever arm the torque with respect to the fulcrum or pivotal point of the inner coupling module which results from the weight force of the inner coupling bearing acting on the first lever arm, which closes off the first lever arm, in addition to the torque of the first lever arm, is also taken into consideration. In other words, the mass of the inner coupling bearing, or a bearing bolt and a bearing bushing of the inner coupling bearing, is also particularly preferably taken into consideration with respect to the total torque of the first lever. The torque caused by the mass of the inner coupling bearing, or of the bolt and the bearing bushing, is preferably balanced with a counter-weight on the second lever arm. In this context this counter-weight can preferably be arranged on the end of the second lever arm. However, any other mass distribution of the second lever arm which is selected such that the total torques on both sides of the lever arms are in equilibrium with one another would also be conceivable.

The applicant reserves the right also to claim this invention in the context of a divisional application.

In a preferred embodiment the outer coupling module is configured such that it acts as a two-sided lever. The fulcrum of this two-sided lever here is the pivotal point of the outer coupling module. This is preferably arranged on the outer rotary part. A first lever arm of the outer coupling module here is preferably given by that part of the outer coupling module which extents starting from the pivotal point thereof to the inner coupling bearing (or to the first bearing position) to the inner coupling module. The second lever arm of the outer coupling module is preferably the counter-weight to the first lever arm of the outer coupling module.

Preferably, the second lever arm of the outer coupling module is configured such that the torque on the side of the first lever arm of the outer coupling module is in equilibrium with the torque on the side of the second lever arm, In this context, on both lever arms only their masses, but not forces additionally acting, should be taken into consideration.

Advantageously, in this context in a first variant the torque which results from the weight of the inner coupling bearing, or the bolt and bearing bushing of the inner coupling bearing, is not taken into consideration in the torque of the first lever arm. The bolt and bearing bushing of the first coupling bearing thus preferably do not count in terms of mass because they are counted in terms of mass with the clutch lever (i.e. inner coupling module). The coupling lever (i.e. the outer coupling module) itself has its own mass balance similarly to a beam balance.

The applicant reserves the right also to claim this invention in the context of a divisional application.

In a second variant, in the case of the first lever arm of the outer coupling module the torque of the inner coupling bearing which closes off the first lever arm is preferably taken into consideration in addition to the torque of the first lever arm itself. In other words the inner coupling bearing, or a bearing bolt and a bearing bushing of the inner coupling bearing, is also counted in the total torque of the first lever. The torque caused by the mass of the inner coupling bearing, or of the bolt and the bearing bushing, is preferably balanced with a counter-weight on the second lever arm. In this context this counter-weight can preferably be arranged on the end of the second lever arm. However, any other mass distribution of the second lever arm which is selected such that the total torques on both sides of the lever arms are in equilibrium with one another would also be conceivable.

In this second variant the bearing bolt and bearing bushing are thus preferably counted with the coupling lever (i.e. the outer coupling module). The counter-weight of the coupling lever (i.e. of the outer coupling module) must therefore additionally balance the bolt and bearing.

The applicant reserves the right also to claim this invention in the context of a divisional application.

Preferably, the length of the second lever arm of the inner and of the outer coupling module is in each case shorter than the length of the first lever arm. Particularly preferably, however, the thickness and/or width and/or the specific weight of the second lever arm is then greater that in the case of the first lever arm.

Preferably, two adjacent coupling mechanisms are in each case arranged diametrically opposite with respect to the rotational axis of the inner rotary part.

In the first and second variant the coupling systems are preferably arranged diametrically opposite. The mass balance indeed takes place to an approximation, associated with the limitation that the balancing coupling mechanism is arranged with an axial displacement. As a result of this the mass balance is not directly opposite, but at an angle and therefore complete balancing cannot take place.

The relative mass balance has been described. The absolute mass balance can be ensured only to an approximation using the measures already described. The aim is to balance the rotating masses independently of the deflections of the coupling mechanism. This is effected by attempting to configure an individual coupling mechanism with neutral mass. Since the coupling lever (i.e. the outer coupling module) acts like a beam balance in terms of mass, its position is unimportant. The clutch lever (i.e. the inner coupling module) together with the bolt and bearing, of neutral mass in configuration results in no imbalance, and thus only a counter-weight, which is just as heavy as the weight of the coupling lever (i.e. of the outer coupling module) is also required diametrically opposite to the pivotal point of the coupling lever (i.e. of the outer coupling module). By this means an individual coupling mechanism can perform kinematic work and at the same time the rotating masses are balanced absolutely. Since several coupling mechanisms usually operate in an arrangement, very smooth running is possible.

Preferably, on the outer rotary part at least one counter-weight which balances the weight of the outer coupling module with respect to a torque with respect to the rotational axis of the outer rotary part is therefore provided. In this context several counter-weights or also a continuous counter-weight distribution can also correspondingly be provided.

The applicant reserves the right also to claim this invention in the context of a divisional application.

In a further advantageous embodiment the continuously variable transmission has a damping device for damping the pulsating output drive energy. Preferably, a dual mass flywheel is provided as a damping device. Particularly preferably, in this context an output drive shaft of the continuously variable transmission is connected to the part of the dual mass flywheel which is smaller in terms of mass, the heavier part of the dual mass flywheel then advantageously being the output drive.

In order to be able to configure the pulsating rotary movement to be on the one hand more uniform and on the other hand more overload-proof, it is advisable namely as a first measure to keep the mass inertias of all the rotating and/or moving parts as low as possible. The central shaft or the inner rotary part preferably does not belong to this. Secondly, the corrugation on the input/output drive is equipped with torsion spring dampers, similarly to that which is conventional on disc clutches on motor cars. Since the transmission energy at the output drive is approximately sinusoidal, torque peaks can exceed the maximum permitted nominal torque. During operation of the dual mass flywheel the output drive shaft is preferably to be connected to the portion which is lower in terms of mass. The heavier part of the dual mass flywheel preferably represents the output drive and thus advantageously takes over the smoothing of the pulsating rotary movement. A uniform rotary movement is thus preferably ensured after the dual mass flywheel.

The applicant reserves the right also to claim this invention in the context of a divisional application.

A hydrodynamic torque converter can preferably be used on the output drive side. This can either be connected upstream or downstream of the dual mass flywheel and/or also employed on the transmission input.

The applicant reserves the right also to claim this invention in the context of a divisional application.

In a further advantageous embodiment the coupling mechanisms are supported on the outer rotary part via a bearing device(s), such as, for example, bearing bolt. Preferably, each coupling mechanism here is supported by a separate bearing device, such as, for example, a separate bearing bolt. In other words an individual bearing device thus serves preferably for receiving or for supporting a single coupling mechanism. Particularly preferably, a bearing device, for example a bearing bolt, also extends also only exclusively to the corresponding region of the coupling mechanism which it supports. That is to say the bearing device is limited spatially to the interior of the outer rotary part which extend radially around that section of the inner rotary part which is assigned to the particular coupling mechanism to be supported (that is to say substantially the region of the inner rotary part on which the particular coupling mechanism is arranged on the inner rotary part).

In the outer rotary part, in the case of, for example, six coupling mechanisms, bolts are guided and secured opposite over all the chamber extending in bores of the outer rotary part. This limits the working range of the coupling mechanism geometrically to the extent that the inner part of the coupling lever (inner coupling bearing), that is to say the inner part of the outer coupling module, adjoins the adjacent bolt and limits the stroke region. If the long bolts are preferably replaced by short bolts which bridge only one chamber, space is additionally gained in this way, which can advantageously be utilised by the coupling mechanism. More space would therefore be available to the coupling mechanism, which would increase the overall conversion. From the point of view of mass, a counter-weight is preferably to be mounted diametrically opposite. Due to the space additionally gained the performance of the transmission increases, with a simultaneous reduction in the rotating masses in the outer rotary part.

The applicant reserves the right also to claim this invention in the context of a divisional application.

Preferably, an active coupling takes places between the inner rotary part and the inner coupling module. Active coupling here is understood as meaning that without an additional control system a non-positive coupling is established between the inner rotary part and the inner coupling module as soon as the inner rotary part rotates faster than the inner coupling module, and that as soon as the inner coupling module rotates more slowly than the inner rotary part the non-positive connection is eliminated. In this context even in an idle state of an inner coupling module at least a slight mechanical contact (via friction) of the inner coupling module with the inner rotary part preferably exists, particularly preferably via sprags or a row of sprags.

During conversion the transmission of power between the inner rotary part and the inner coupling module (clutch lever) preferably always takes place when the inner rotary part (driven) rotates faster than the inner coupling module (the clutch lever). That is to say for kinematic reasons free-running preferably cuts in (sprag) and for this moment a non-positive connection is established. When the inner coupling module (the clutch lever) rotates more slowly than the inner rotary part, the non-positive connection is then eliminated. This principle renders possible an automatic control of the clutch and thus a transfer of energy. The low friction of the sprag in the idling direction preferably renders possible the process explained above.

Preferably, a passive coupling takes place between the inner rotary part and the coupling mechanism or the inner coupling module. A control device which, as a function of the angular speed of the inner rotary part and/or as a function of the angular speed of an inner coupling module of the coupling mechanism, establishes and/or releases a non-positive coupling between this inner coupling module and the inner rotary part is preferably provided for this.

Particularly preferably, the control device controls the establishing or the release of a non-positive coupling as a function of a comparison of the angular speed of the inner rotary part and of the inner coupling module. Advantageously, the control device here causes the establishing of a non-positive coupling between the inner rotary part and an inner coupling module as soon as the inner rotary part has a higher angular speed than the inner coupling module in question, and preferably the control device causes the release of the non-positive coupling between the inner rotary part and an inner coupling module as soon as the angular speed of the inner coupling module decreases.

Preferably, the control device can establish a non-positive coupling between each coupling mechanism or each inner coupling module and the inner rotary part, preferably in any desired sequence.

Preferably, at least one sensor element is provided, by means of which the control device can determine the angular speed of the inner coupling module of a coupling mechanism. Particularly preferably, each coupling mechanism has a sensor element, so that in each case the angular speed thereof can be determined. In this context only one sensor element can also be provided, by means of which the control device can determine directly only the angular speed of one inner coupling module. Preferably, the control device can determine the angular speeds of all the other inner coupling modules starting from the angular speed of this one inner coupling module via fixed given phase relationships.

Preferably, a transmission of power takes place hydraulically between the inner rotary part and a coupling mechanism or the inner coupling module of a coupling mechanism.

The transmission of power can preferably be achieved under external control by means of sensors and externally actuated clutch elements. The driven inner rotary part is preferably provided with discs which are arranged successively advantageously in the number of the coupling levers (outer coupling modules), and each of which is rotatably connected to an e.g. hydraulic saddle of the inner coupling bearing. The clutch process can thus preferably be controlled precisely and effectively via a computer. Nominal and actual values from the inner rotary part and saddle (inner coupling lever) relating to the speed are compared. If the disc of the central shaft is exactly as fast as the saddle, the hydraulics preferably close the brake linings encompassing the disc, which for this moment go into non-positive connection. Energy can thus be transferred. When the angular speed of the saddle becomes slower again, the hydraulics open the linings and release the disc in question again. The process is repeated in cycles for each revolution of the inner rotary part, depending on the conversion selected.

In a further variant at least one sensor element is provided in the continuously variable transmission, which, as a function of the kinematics of the rotatable components, for example the inner rotary part and/or a sprag and/or at least a row of sprags and/or the inner coupling module, emits a control signal when the angular speed of the inner rotary part exceeds that of the inner coupling module, or the angular speed of the inner coupling module decreases. This can take place, for example, by the sensor element being suitable to detect whether a sprag element is under non-positive connection with the inner rotary part and the inner coupling module. This would be conceivable, for example, by means of a pressure sensor.

Instead of the non-positive couplings described above, other types of coupling, for example positive couplings, would be conceivable.

The applicant reserves the right also to claim this invention in the context of a divisional application.

Preferably, the inner coupling module comprises materials or is made of materials which have a tensile strength from the range between 200-2,000 N/mm$^2$, particularly preferably between 800 and 1,000 N/mm$^2$. Furthermore, the material for the internal parts can preferably be selected from a group of materials which includes manganese steel, carbon steel, titanium/titanium/aluminium alloys, case hardened steel, cast steel, composite materials and combinations of these.

Preferably, the inner rotary part of coupling elements can be supported against deflection.

The applicant reserves the right also to claim this invention in the context of a divisional application.

In a further preferred embodiment magnets are arranged on the outer rotary part.

Further possible implementations of the invention also include combinations which are not mentioned explicitly of features or embodiments which are described above or in the following with respect to the examples. In this context the person skilled in the art will also add individual aspects as improvements or additions to the particular basic form of the invention.

The invention is described in more detail in the following with reference to the attached drawing and with the aid of examples.

Figure 2:
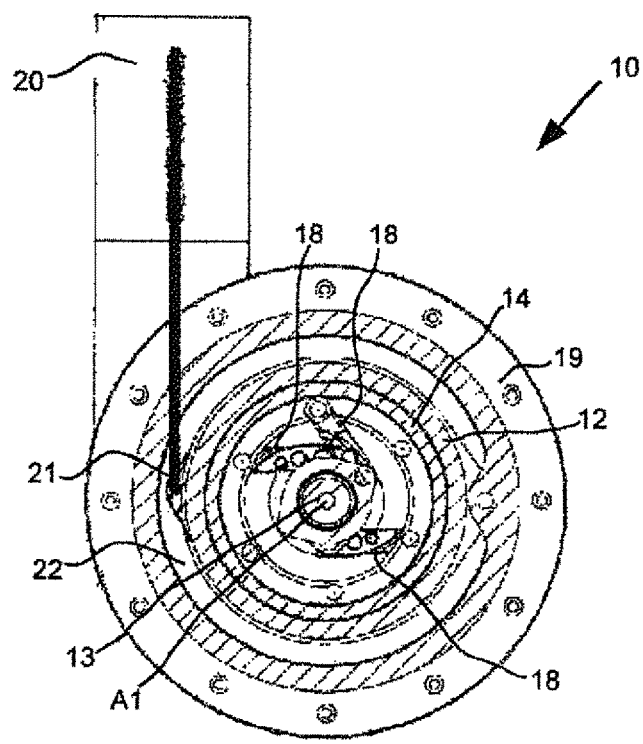
Figure 3:
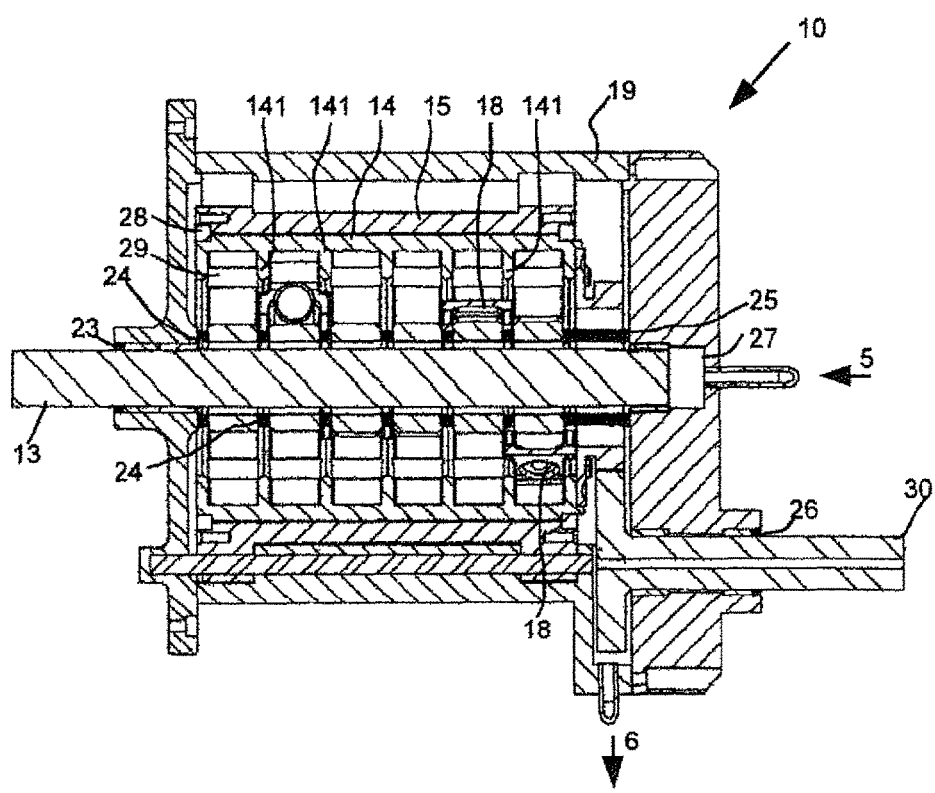
Figure 4:
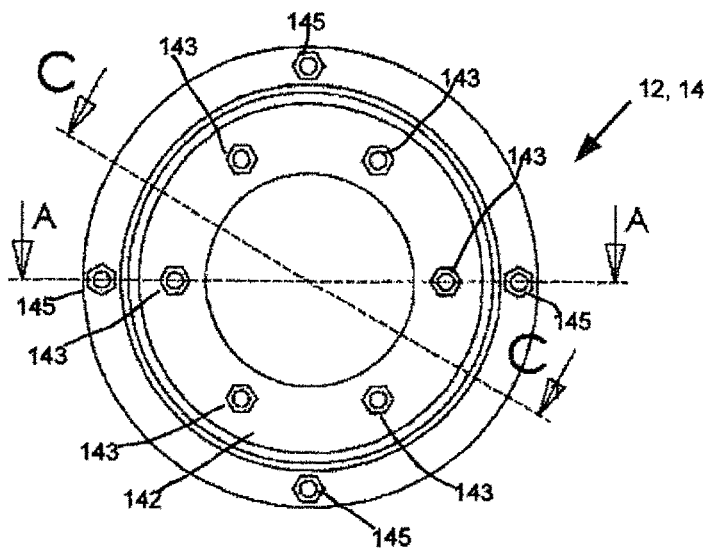
Figure 5:
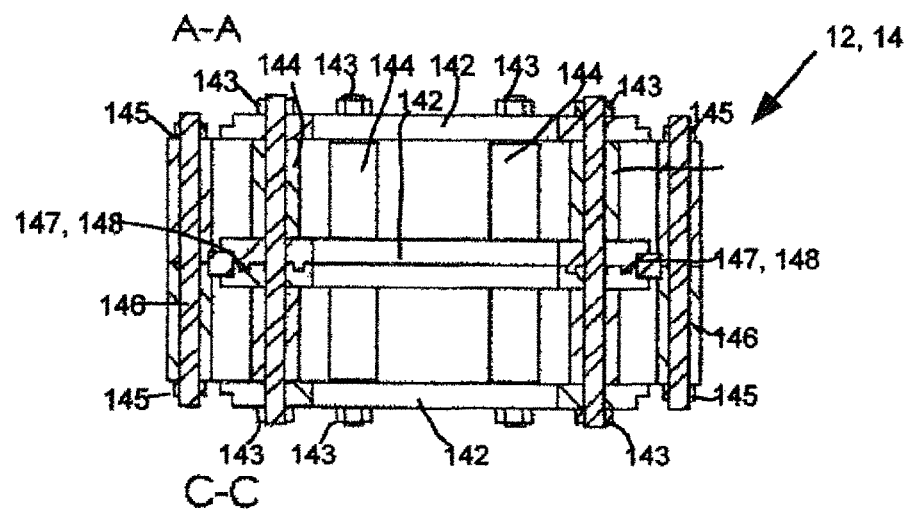
Figure 6:
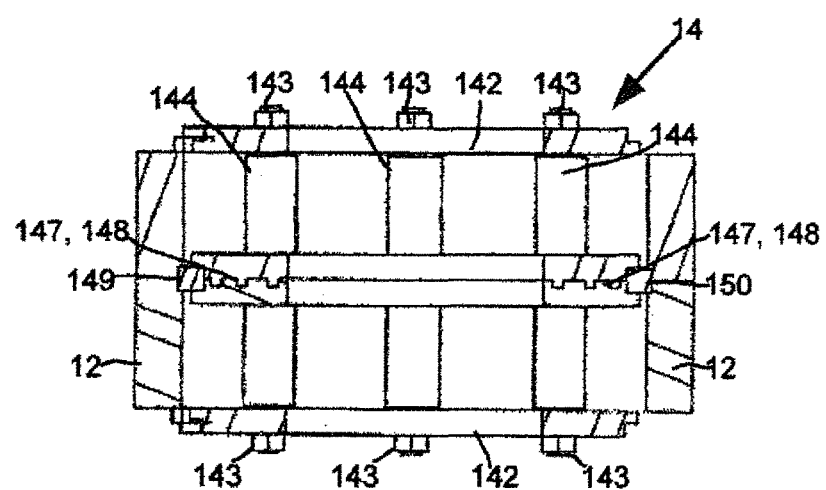
Figure 7:
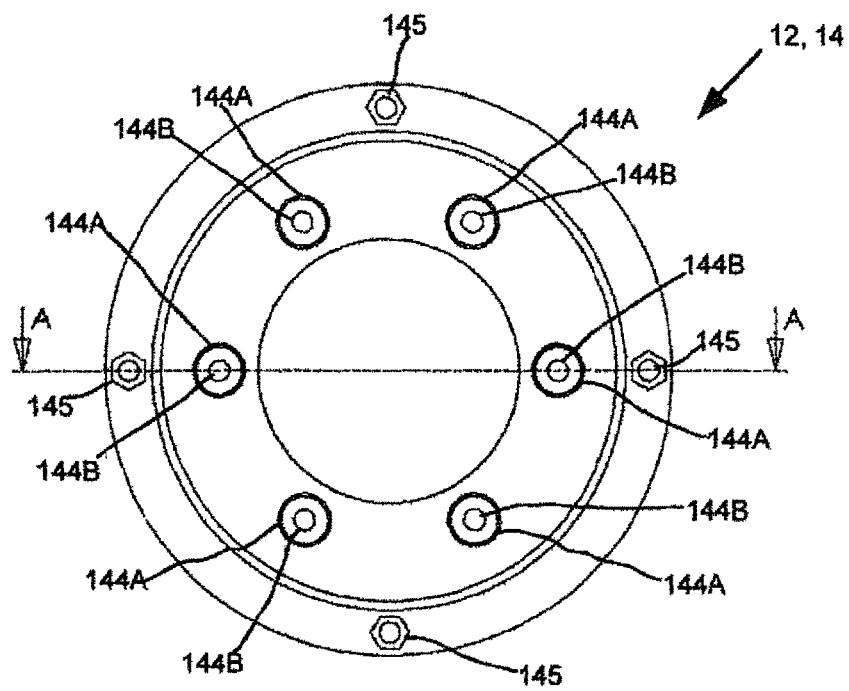
Figure 8:
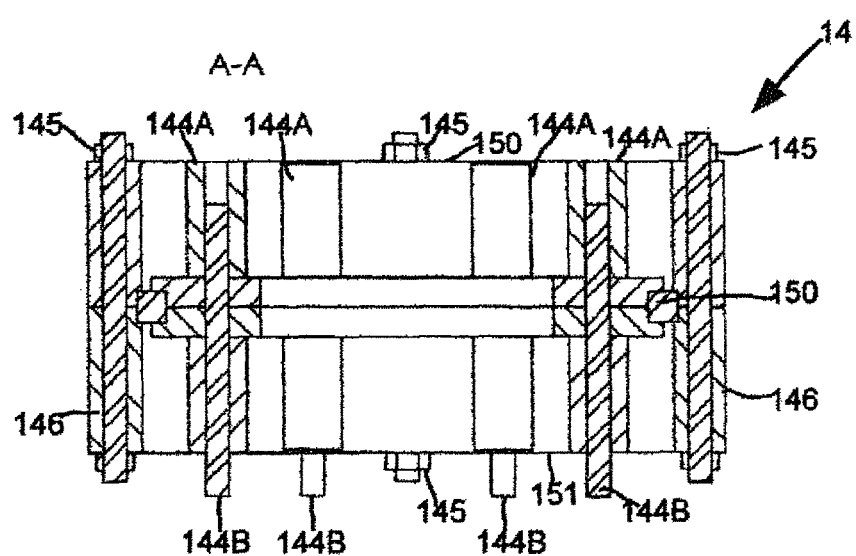
Figure 9:
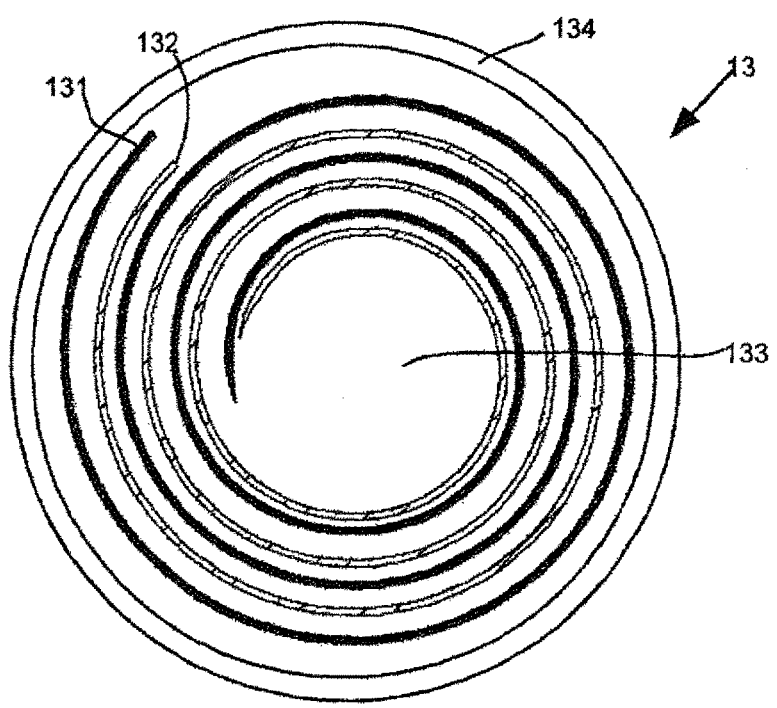
Figure 10:
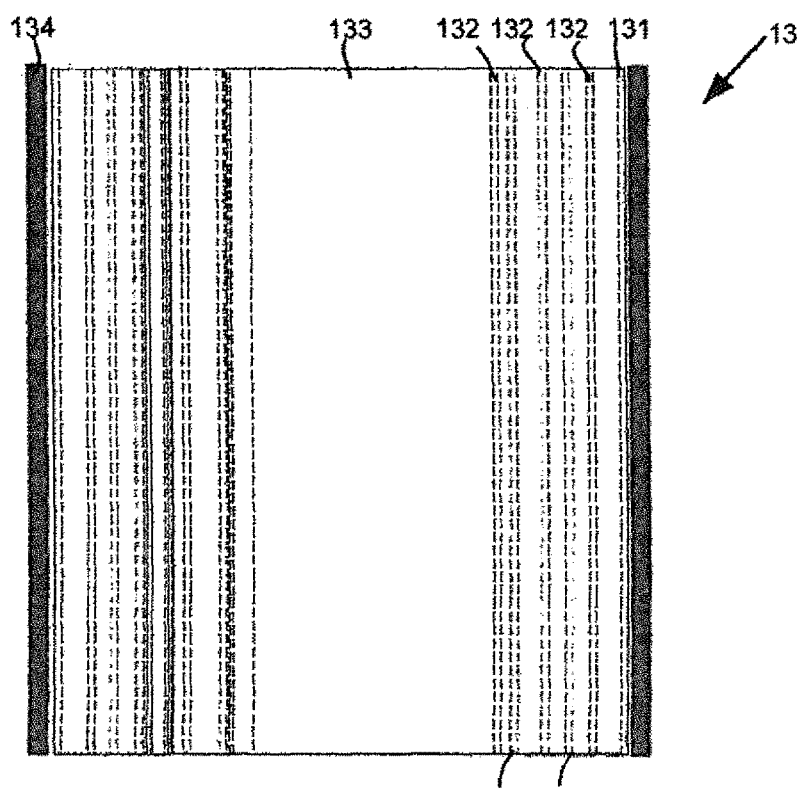
Figure 11:
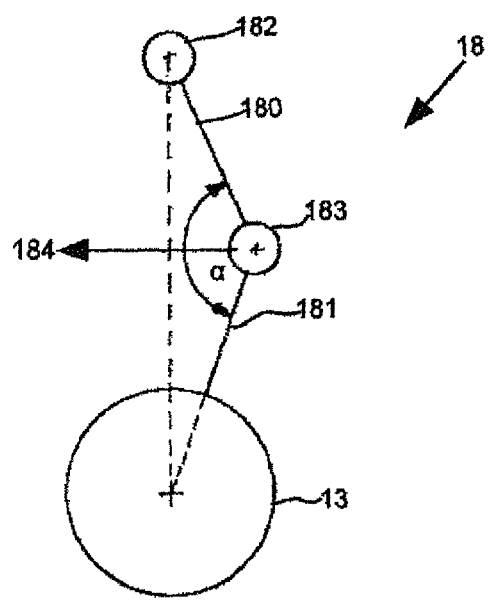
Figure 12:
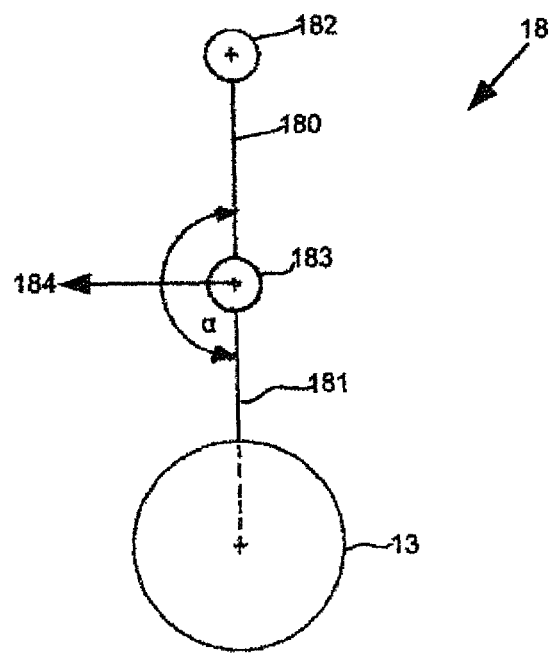
Figure 13:
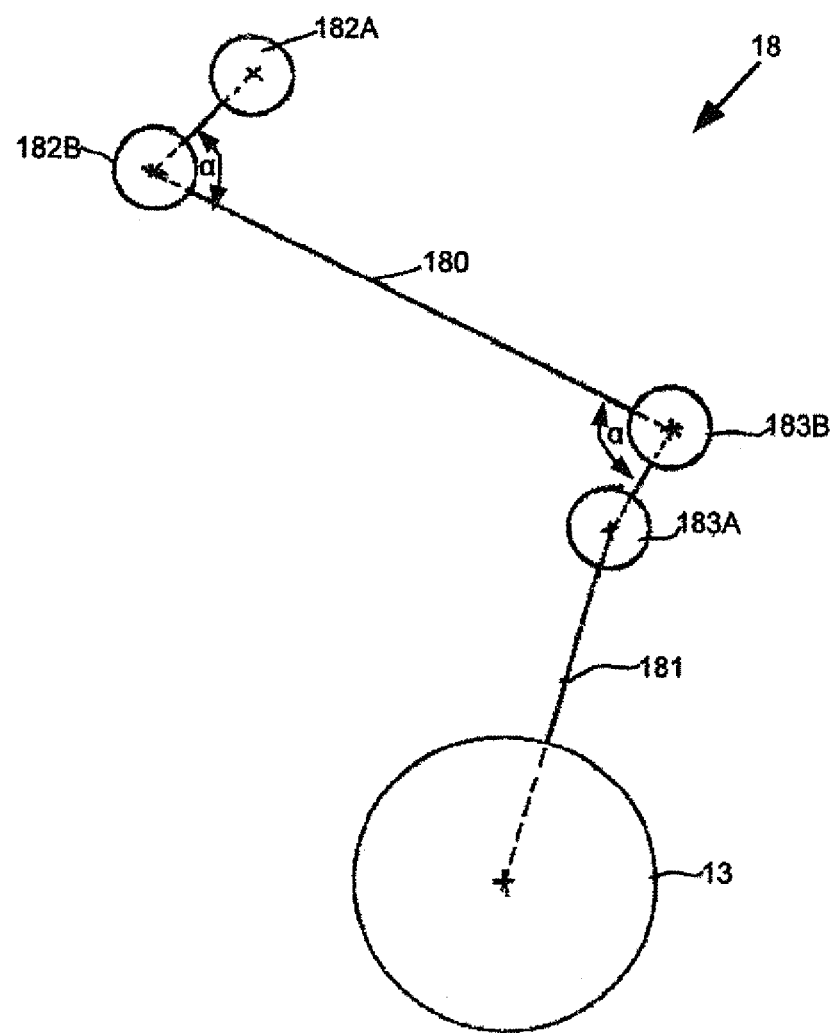
Figure 14:
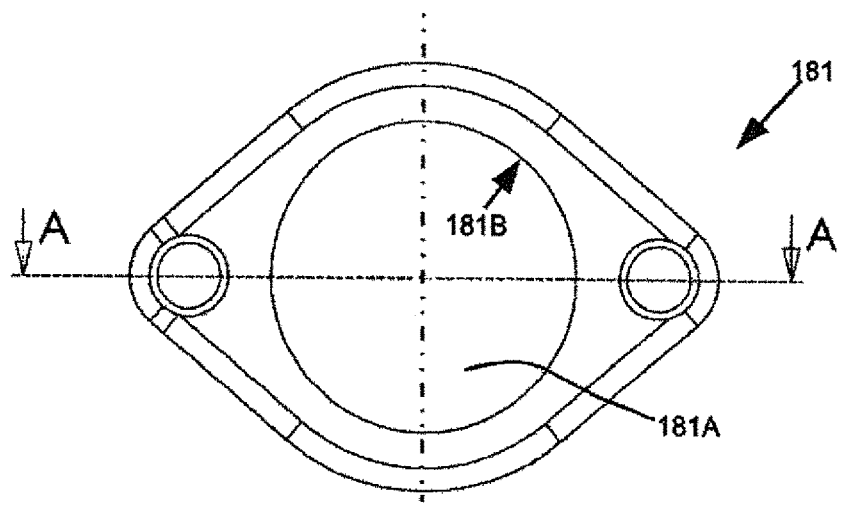
Figure 15:
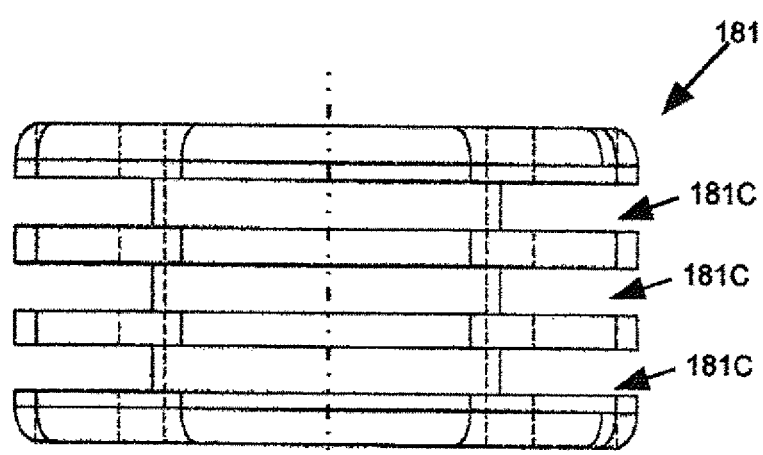
Figure 16:
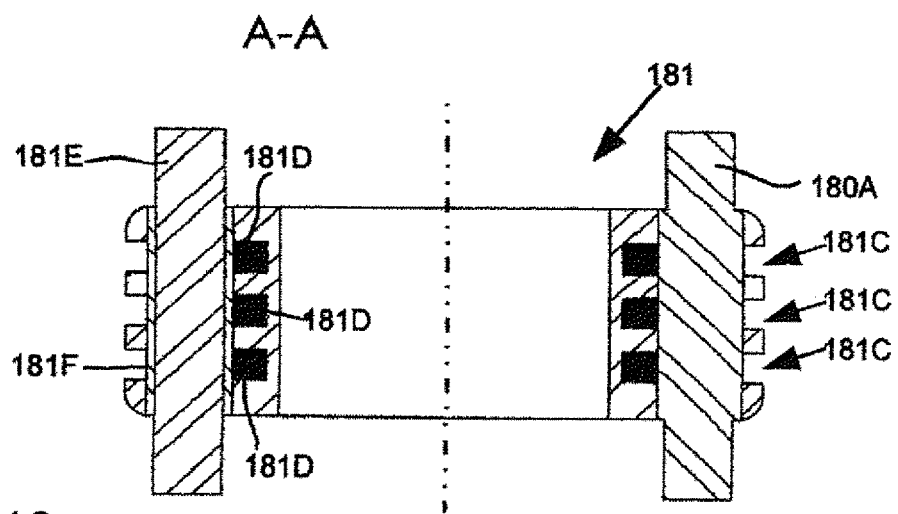
Figure 17:
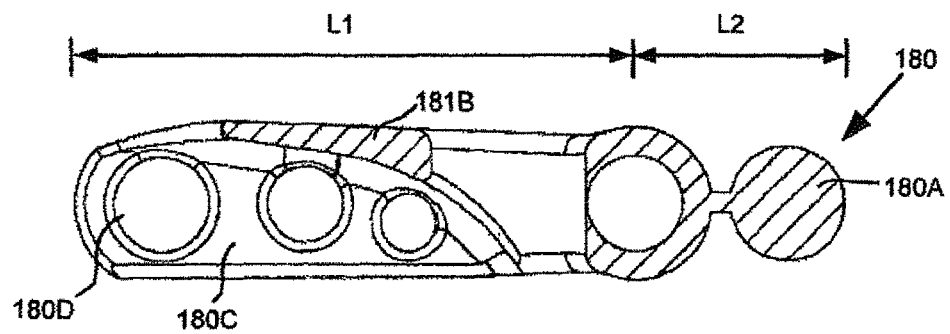
Figure 18:
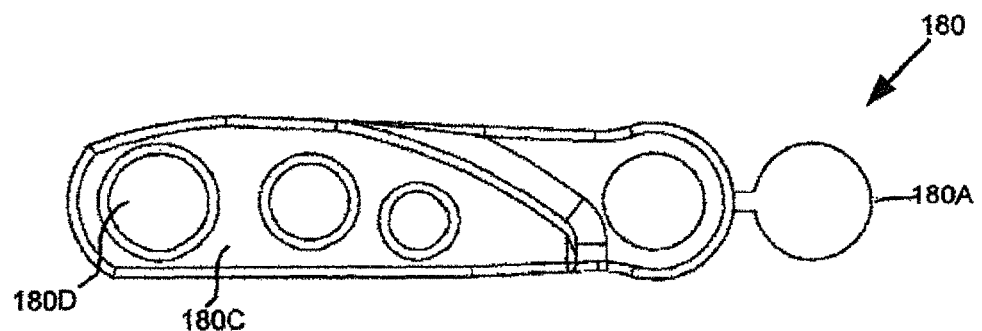
Figure 19:
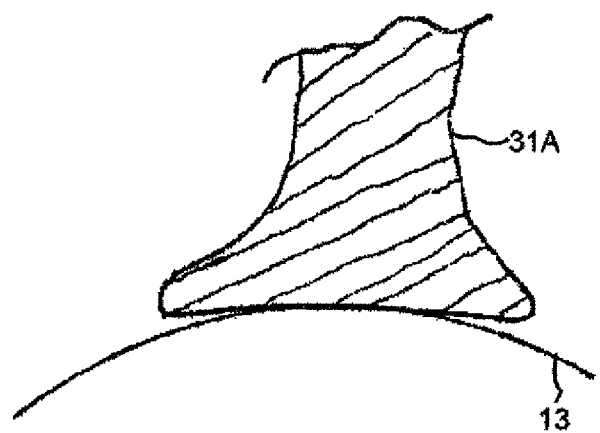
Figure 20:
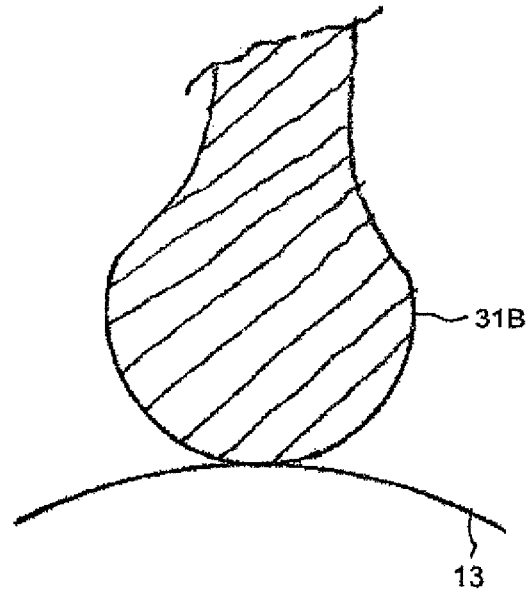
Figure 21:
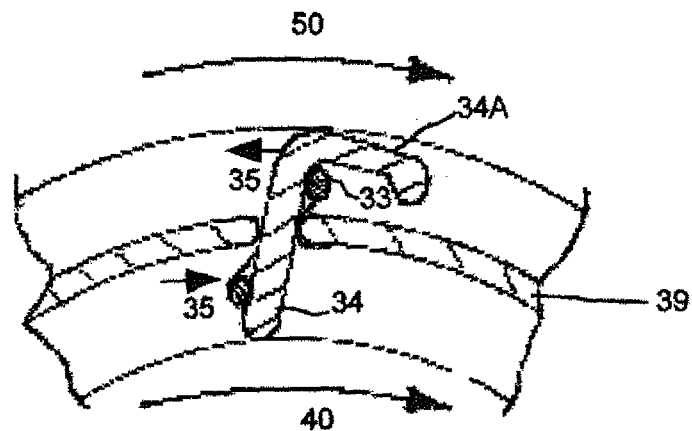
Figure 22:
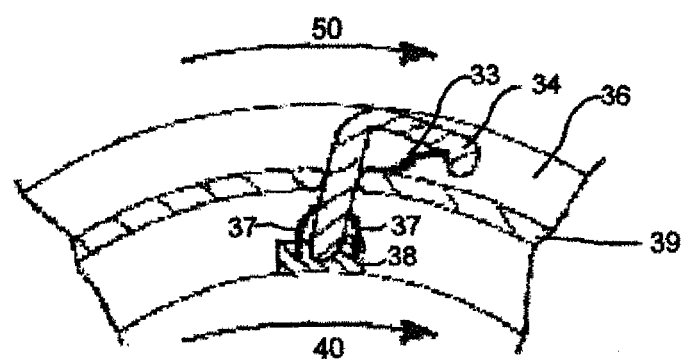
Figure 32:
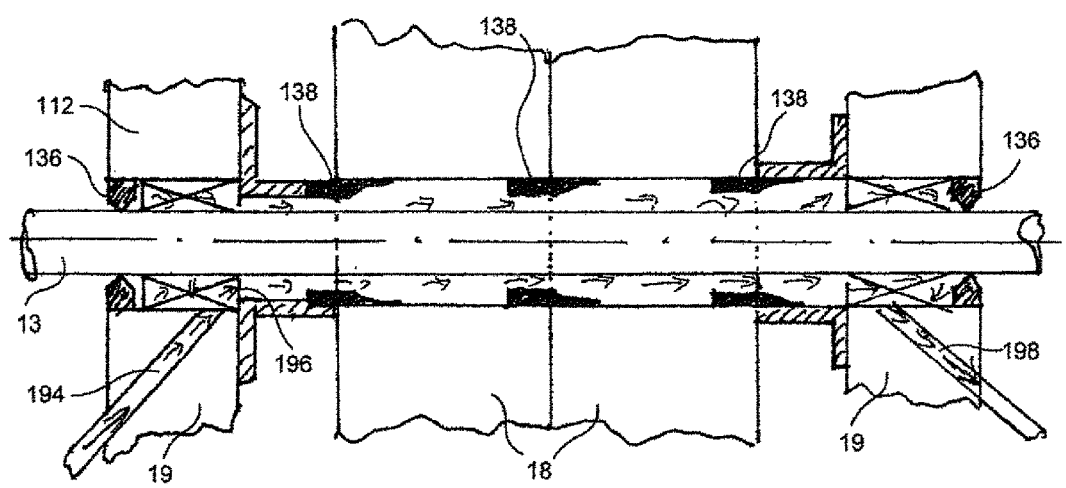
Figure 33:
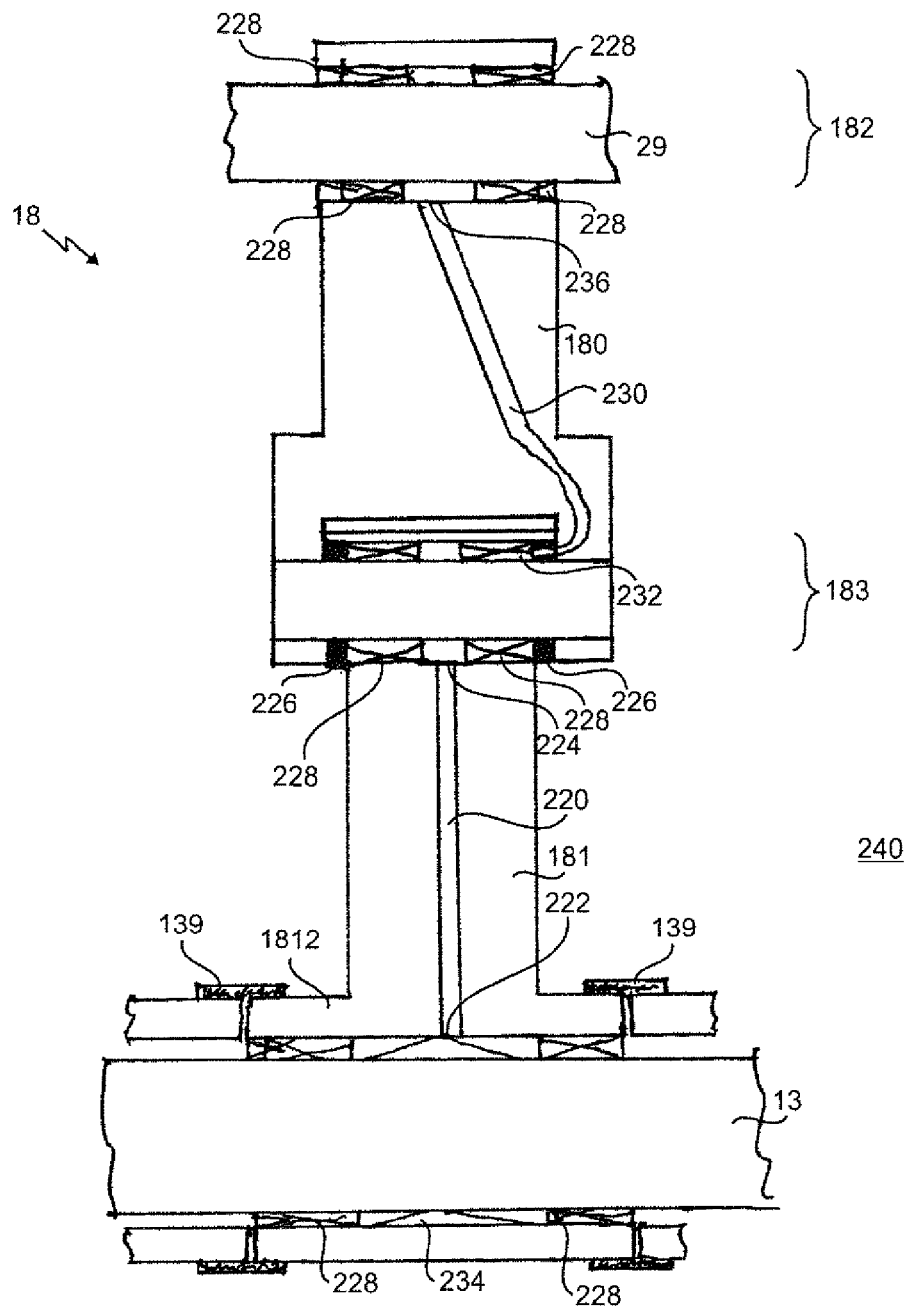
Figure 34:
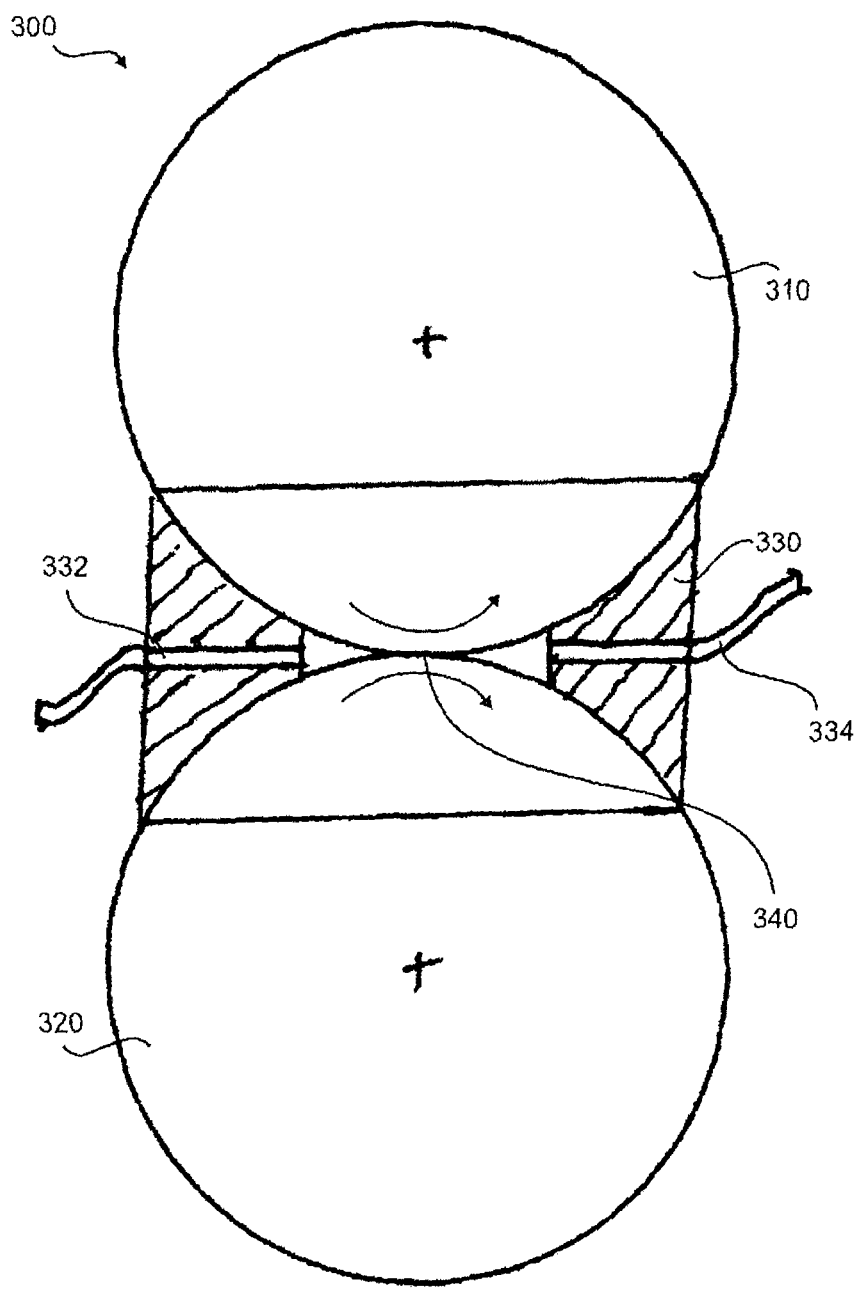
Figure 35:
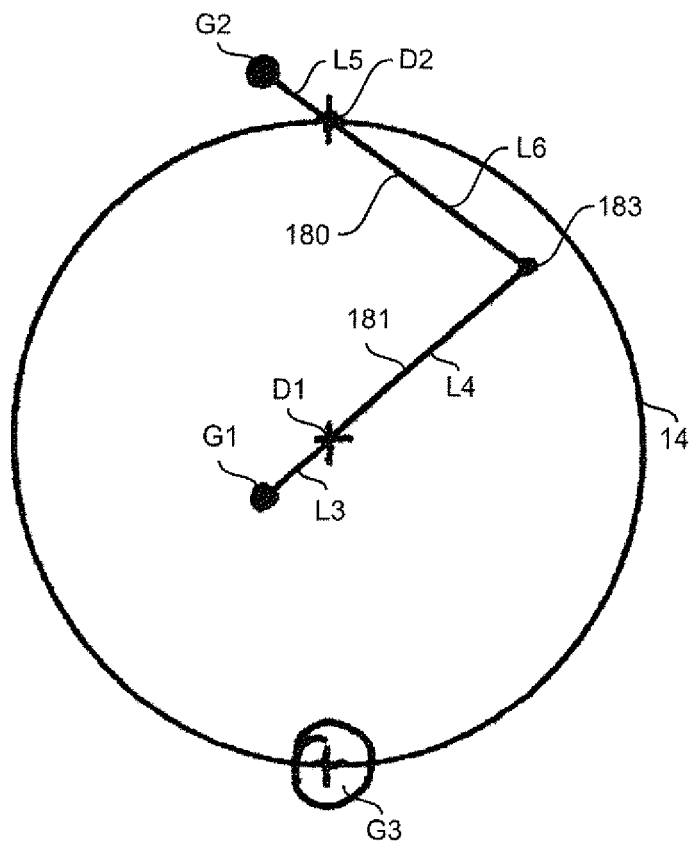
Figure 36:
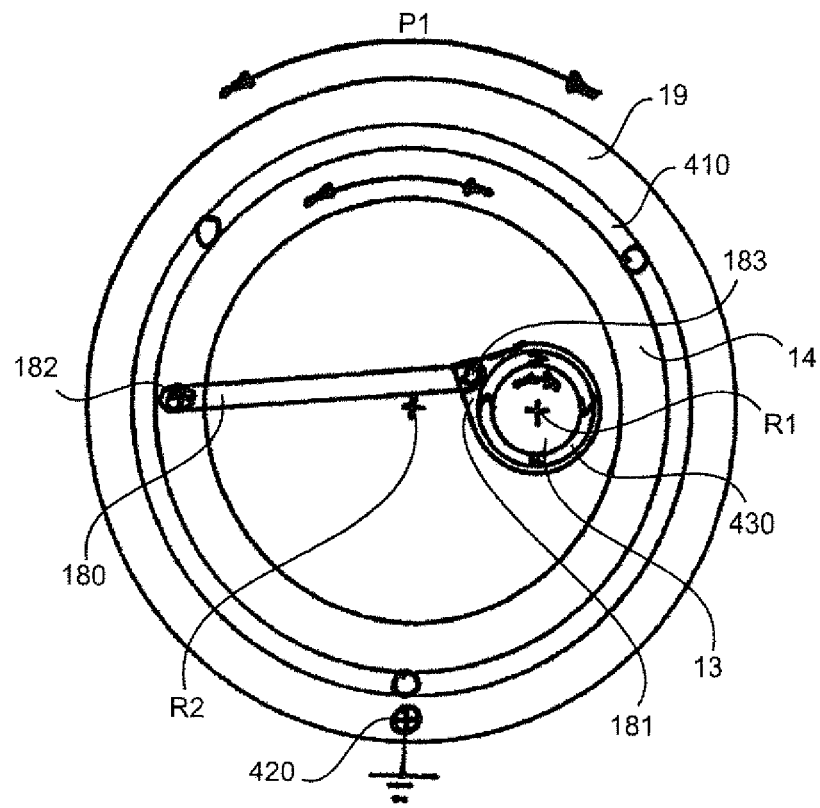
Figure 37:
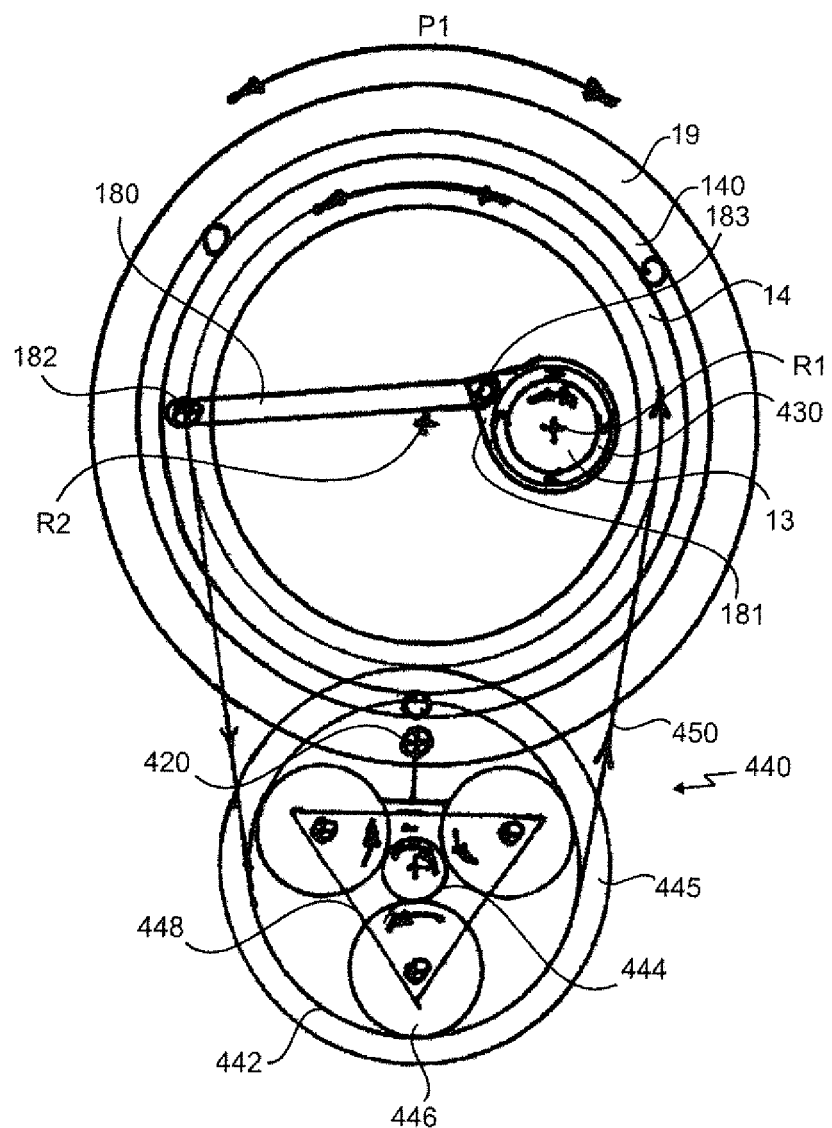

The figures show:

FIG. 1 a three-dimensional view of a continuously variable transmission according to a first example;

FIG. 2 a plan view of a continuously variable transmission according to the first example;

FIG. 3 a section view of the continuously variable transmission according to the first example;

FIG. 4 a plan view of an outer rotary part of the continuously variable transmission according to a second example;

FIG. 5 a section along a line A-A in FIG. 4 through the outer rotary part of the continuously variable transmission according to the second example;

FIG. 6 a section along a line C-C in FIG. 4 through the outer rotary part of the continuously variable transmission according to the second example;

FIG. 7 a plan view of an outer rotary part of the continuously variable transmission according to a third example;

FIG. 8 a section along a line A-A in FIG. 7 through the outer rotary part of the continuously variable transmission according to third example;

FIG. 9 a section parallel to the radius through an inner rotary part of the continuously variable transmission according to a fifth example;

FIG. 10 a longitudinal section through the inner rotary part of the continuously variable transmission according to the fifth example;

FIG. 11 and FIG. 12 diagrams to illustrate a construction of a coupling mechanism of the continuously variable transmission according to a sixth example;

FIG. 13 a diagram of a construction of a coupling mechanism of the continuously variable transmission according to a seventh example;

FIG. 14 to FIG. 16 views of an inner coupling module of the continuously variable transmission according to an eighth example;

FIG. 17 and FIG. 18 views of an outer coupling module of the continuously variable transmission according to the eighth example;

FIG. 19 and FIG. 20 in each case views of variants for a sprag of the continuously variable transmission according to the eighth example;

FIG. 21 and FIG. 22 in each case views of further variants for a sprag of the continuously variable transmission according to the eighth example;

FIG. 23 to FIG. 26 in each case variants for an axial securing of a bolt or a shaft of the continuously variable transmission according to the eighth example; and FIG. 27 to FIG. 31 in each case variants for a radial securing against twisting of a bolt or a shaft of the continuously variable transmission according to the eighth example;

FIG. 32 a section view of a preferred embodiment of the continuously variable transmission to illustrate a variant for a lubricant supply;

FIG. 33 a diagram of a section view of a preferred embodiment of a part of the continuously variable transmission to illustrate a variant for a lubricant supply with a first and a second lubricant guiding device;

FIG. 34 a diagram of a gear lubricant pump;

FIG. 35 a diagram of the arrangement and configuration of the inner and outer coupling module to illustrate the relative and absolute mass balancing of the movable coupling modules;

FIG. 36 a cross-section drawing in diagram form of a preferred embodiment;

FIG. 37 a cross-section drawing in diagram form of a preferred embodiment with planetary transmission.

In the figures elements which are identical or of identical function are given the same reference symbols, unless stated otherwise.

FIG. 1 shows a base plate 1, on which a continuously variable transmission 10 is mounted without a housing. The base plate 1 can also be configured differently as required. The transmission 10 has a first bearing and guiding module 11 and a second bearing and guiding module 12, and an inner rotary part 13, which is rotatable around its axis A1, an outer rotary part 14 and an adjusting element 15, which is guided in a guiding element 16 and is rotatably supported with a bearing 17.

As shown in FIG. 2, in which the base plate 1 is not shown, the continuously variable transmission 10 furthermore has several coupling mechanisms 18 and a housing 19, which is arranged around the second bearing and guiding module 12, and optionally also an adjustment drive device 20 and a bearing position 21 for the adjusting element 15. A fixing flange for the second bearing and guiding module 12 can be integrated in the housing 19. In the continuously variable transmission 10 according to FIG. 1 and FIG. 2 the coupling mechanisms 18 couple the inner rotary part 13, which is configured as a shaft, and the outer rotary part 14, which is configured as a hollow cylinder. Conversion of the rotational speed of the inner rotary part 13 into a rotational speed of the outer rotary part 14 or vice versa can thus be performed. In the case shown in FIG. 1 and FIG. 2 the ratio of the rotational speeds of the inner rotary part 13 and outer rotary part 14 is 1:1, so that the continuously variable transmission 10 implements neither an upwards conversion nor a downwards conversion. The inner and outer rotary part 13, 14 are rotatable with the same rotational speed in this case.

In the continuously variable transmission 10 the first bearing and guiding module 11 serves to support and guide the inner rotary part 13. The inner rotary part 13 is rotatably supported on the first bearing and guiding module 11 and arranged in the outer rotary part 14, which is arranged outside around the inner rotary part 13. The first bearing and guiding module 11 ensures that the inner rotary part 13 can implement exclusively a rotary movement around its axis A1.

In contrast, the second bearing and guiding module 12 serves to support and guide the outer rotary part 14. The second bearing and guiding module 12 has, like the outer rotary part 14, a hollow cylindrical or drum-like shape and supports the outer rotary part 14 on its outside. The second bearing and guiding module 12 supports the outer rotary part 14 pivotably with respect to the inner rotary part 13. The pivoting adjustment can be performed with the adjusting element 15 in the form of a threaded spindle. The adjusting element 15 here can be moved upwards in the guiding element 16 in FIG. 1 or FIG. 2, in order to establish a conversion C>1 in the continuously variable transmission 10. However, if the adjusting element 15 is moved downwards in the guiding element 16 in FIG. 1 or FIG. 2, a conversion C>1 can likewise be established in the continuously variable transmission 10. In this context the outer rotary part 14 can be adjusted such that the inner rotary part 13 is arranged eccentrically to the axis of the outer rotary part 14. In such cases the conversion of the continuously variable transmission 10 is not equal to 1:1. In particular, it has been found in experiments that the conversion from the outside inwards, that is to say from the outer rotary part 14 to the inner rotary part 13, is different to a conversion from the inside outwards, that is to say from the inner rotary part 13 to the outer rotary part 14. In particular, a three-dimensional pivoting movement of the outer rotary part 14 can be realised with the adjusting element 15. The points of the pivot bearing should lie as far apart as possible.

As illustrated in FIG. 2, the adjusting element 15 can optionally also be moved with the adjustment drive device 20, which is configured as a motor and in particular as a spindle gear motor etc., or as a piston, such as, in particular, a double action hydraulic piston, a double action pneumatic piston etc. For this, the adjustment drive device 20, more accurately the bearing position 21 in FIG. 2, can also be arranged in the axial direction of the second bearing and guiding module 12 centrally on the second bearing and guiding module 12. The adjustment drive device 20 in FIG. 2 is consequently also arranged in the axial direction centrally to the outer rotary part 14. In such an arrangement the force transmission is particularly advantageous. However, the arrangement can also be at any point along the cylinder. Overall, however, it is to be taken into account that the points of the adjusting or pivot support should lie as far apart as possible in order to obtain the highest possible torsional stability of the second bearing and guiding module 12 accompanying the housing 19.

According to the construction of the continuously variable transmission 10 according to FIG. 2, the functional parts, such as second bearing and guiding module 12, outer rotary part 14, housing 19 have annular shapes. The reason for this is that approximately annular cylindrical parts can accommodate extremely high torsion and flexural forces in their shell plane relative to their diameter. The inner rotary part 13 in FIG. 2 has the lowest diameter, but the greatest wall thickness. The wall thickness of the individual functional parts decreases with increasing diameter of the individual functional parts. For this reason the wall thicknesses can be kept low, which independently of the material results in low weight at maximum strength.

The annular gap 22 between the housing 19 and the second bearing and guiding module 12 shown in FIG. 2 is not absolutely necessary. The housing 19 can also be arranged directly adjacent to the second bearing and guiding module 12 at least in a part region.

FIG. 3 shows the continuously variable transmission 10 in a variant having six coupling mechanisms 18 in a longitudinal section. However, more or fewer coupling mechanisms 18 can also be present. The coupling mechanisms 18 are each arranged between two bars 141 of the outer rotary part 14. The bars 141 each protrude outwards in the radial direction of the outer rotary part 14 in the direction of the first rotary part 13. For clarity, in FIG. 3 only some of the coupling mechanisms 18 and the bars 141 are provided with a reference symbol. In FIG. 3, furthermore, the first to fourth sealing elements 23, 24, 25, 26, a recess 27, a bearing 28 to support the outer rotary part 14 and a bearing bolt 29 for the coupling mechanisms 18 are shown. For clarity, in FIG. 3 only two of the second sealing elements 24 are provided with a reference symbol. The coupling mechanisms 18 are arranged around the inner rotary part 13 via a sprag-type freewheel clutch or a radial support and furthermore are connected to the outer rotary part 14. In the coupling system of coupling mechanisms 18 and sprag-type freewheel clutch or radial support, corresponding to their angles of action accompanying the mass accelerations during operation of the continuously variable transmission 10, very high varying tensile and compressive forces of an older of approx. 4,000 N arise at 160 Nm output torque, these forces acting between the inner rotary part 13 and the outer rotary part 14. As a consequence thereof, all the components of the continuously variable transmission 10 must withstand these high forces. The outer rotary part 14 is therefore divided on its inside with the bars 141 into annular chambers which have two tasks. On the one hand the bars 141 and therefore the chambers give the outer rotary part 14 an extremely high radial stability and shape retention, on the other hand the annular bars 141 form a receiver for supporting the coupling mechanisms 18.

Furthermore, the continuously variable transmission 10 in FIG. 3 has a pump 30 which can pump a lubricant in the direction of an arrow 5, that is to say in the axial direction, into the housing 19. In the direction of an arrow 6, that is to say in the radial direction, the pump 30 can pump the lubricant out of the housing 19. The pump 30 can therefore supply all the bearing positions arranged around the inner rotary part 13, and the coupling mechanisms 18 with lubricant in the axial direction. As a result the temperatures of the continuously variable transmission 10 can be kept low, so that as little friction as possible is present. The lubricant 10 can be, in particular, oil.

As shown in FIG. 3, the lubricant is pumped by the pump 30 into the annular recess 27 axially and above the shell line of the inner rotary part 13. Furthermore, the coupling elements 18 arranged in series are sealed off axially from one another and from the housing 19 with the first to fourth sealing elements 23, 24, 25, 26, so that the coupling system/bearing or clutch system/bearing furthest removed from the lubricant supply is also adequately supplied with lubricant. The sealing described above is configured such that it is partially permeable to the lubricant in the radial direction.

The second sealing elements 24 are consequently arranged around the inner rotary part 13 in the axial direction of the inner rotary part 13. The second sealing elements 24 can be configured as thrust/sealing washers which have furrows or channels or bores in the radial direction, which have the purpose of allowing a particular amount of lubricant to arrive at the coupling mechanisms 18 and the remaining bearing positions. During operation of the continuously variable transmission 10 the lubricant is delivered by the centrifugal force from the inner rotary part 13 outwards in the direction of the outer rotary part 14 and the housing 19. At the housing inner wall the lubricant runs to the lowest point and can be sucked up from there by the pump 30 and delivered out of the housing 19 in the direction of the arrow 6. The centrifugal force of the rotating parts thus distributes a portion of the lubricant effectively to the coupling mechanisms 18 and all other bearing positions. The pump 30 can also be realised with gear wheels.

The continuously variable transmission 10 according to the first example thus comprises a highly effective lubricant circulation in which the inner rotary part 14 is configured as a solid part. The inner rotary part 13 has, for example, no oil supply bores, which represent a weakening of the shaft statics and from which rupture lines can start. This is a great advantage since the inner rotary part 13 is always the weakest member in the construction relative to all the other cylindrical components of the continuously variable transmission 10. The reason for this is that the inner rotary part 13 always has the smallest diameter with respect to its span relative to the other cylindrical components, and therefore its flexing is the greatest.

For this reason the inner rotary part 13 can also be manufactured from high performance materials, such as e.g. special steels etc., which have a very high tensile/compressive stress, or with the largest possible diameters.

In a modification of the first example the coupling mechanisms 18 are arranged without an axial separation from the inner rotary part 13. In this case the second sealing elements 24 are omitted. The lubricant-delivering furrows or channels or bores are then mounted directly laterally on the coupling mechanisms 18.

According to a further modification of the first example the lubricant can be sprayed on to the coupling mechanism 18 through stationary nozzles on the housing 19. The nozzles can also be fixed on the second bearing and guiding module 12. The coupling mechanism 18 has axial lubricant guiding slots on the side towards the outer rotary part 14, which allow the lubricant to be guided to the bearing positions.

In the continuously variable transmission 10 the operating rotational speed and the associated performance of the inner or outer rotary part 13, 14 as an oscillation generator represents an important pillar. There is the possibility of driving the oscillation generator with several times the input rotational speed and of correspondingly converting down the output rotational speed with the same conversion C. For example 1:3 input drive, 3:1 output drive.

Since the coupling mechanism 18 must rotate or shift more often relative to the input rotational speed, the transmission torque per shift pulse falls. That is to say the coupling systems shift more often with lower torques according to the conversion. Oscillation generators with as far as possible constant high rotational speeds which as far as possible have no rotary imbalances should therefore be available. The further examples show specific further configurations for this.

It is moreover to be noted that based on the phase angle of the input rotational speed a pulse is generated according to the input conversion, that is to say e.g. the oscillation generator has six coupling mechanisms 18 which are arranged with a displacement of in each case 60° on the outer rotary part 14. This means at an input conversion of 1:3 a pulse takes place every 20°, based on the phase angle of the input rotational speed. Assuming that in the transmission 10 at a conversion C=1:1 the input drive rotational speed is the same as the output drive rotational speed, the input conversion must be reversed again after the oscillation generator, that is to say 3:1. This means that starting from the abovementioned example with six coupling mechanisms 18, a pulse takes place on the transmission output every 60°, only with the difference that the oscillation generator had shifted the energy to be transmitted three times more often, accompanying a corresponding lower coupling torque. Using this method the conversion range can be enlarged and the shifting torques of the coupling systems reduced.

In a continuously variable transmission 10 having a downstream differential and zero passage the advantages have a particular effect. The extension of these properties represents the connecting of an oscillation generator having a differential transmission. If the arrangement is realised with a planetary transmission which has 20 teeth on the sun wheel and 100 teeth on the ring gear, the sun wheel can be connected to the output drive of the oscillation generator, which rotates five times faster than the input rotational speed, the ring gear rotating once opposite to the input rotational speed. If the ring gear is driven on the outer teeth, an additional gear wheel is required. If the ring gear is driven internally, this gear wheel is dispensed with. When the arrangement is set in operation at C=0 of the oscillation generator, the sun wheel rotates five times and the ring gear once in the opposite direction. The consequence is that the planetary wheel set stands, which represents the transmission output drive. Starting from the abovementioned example of employing six coupling mechanisms 18, the pulse phase angle, 60° here, is divided by the factor of the power split, factor 5 here. From this it results that 60° divided by 5 equals 12°. Since the reference level is zero, on the one hand the number of pulses and conversion depends on the split ratio of the planetary transmission, and on the other hand it depends on the extent to which the continuously variable transmission 10 is converted relative to the rotational speed of an input drive machine, not shown.

According to a second example the outer rotary part 14 is modified, as shown in FIG. 4 to FIG. 6 and described below. The continuously variable transmission 10 is otherwise constructed as in the first example.

In the present example, for the outer rotary part 14 discs 142, which in particular are annular in configuration, are fixed on bearing bolts 144 by means of fixing elements 143, such as screws, rods and nuts. The fixing elements 143 are arranged on the ends of the bearing bolts 144. One of the discs 142 can have openings, the other can have threaded openings. The number of discs 142 is determined by the number of chambers formed by the bars 141. Furthermore, fixing elements 145, such as screws, bars and nuts etc., and bearing bolts 146 are provided with respect to the second bearing and guiding module 12. In FIG. 4 to FIG. 6, as fixing elements 143, 145 in each case a rod with thread on its two ends is thus screwed with nuts. Alternatively, the rod can also be provided with a thread only one of its two ends. The rod is arranged in a hollow cylindrical rotary part, the bearing bolt 144 or the bearing bolt 146. The hearing bolt 144 serves as a bearing of the outer part of the coupling mechanism 18, which part is also called outer coupling module in the following. The bearing bolt 146 serves as a bearing of the second bearing and guiding module 12. In FIG. 6 a support is moreover provided with a reference symbol 149.

In this embodiment of the outer rotary part 14 it is the aim to connect the two annular discs 142 such that they cannot shift relative to one another. This construction, which is also called compressive stress construction, decisively increases the resistance to twisting and flexing of the two components, so that they acquire strength as if it were a one-piece component which, in particular, is annular. This construction can be employed generally in the continuously variable transmission 10, that is to say for all concentric parts of the continuously variable transmission 10.

Due to the absence of a shell plane the bearing bolts 144, 146 are better equipped against flexing. A higher instability can develop in the torsional direction of the outer rotary part 14, which can be counteracted, for example, with in each case two opposite cross-bars.

As furthermore shown in FIG. 5, two discs 142 in the centre of the outer rotary part 14 are interlocked with one another with the aid of teeth 147, 148 formed from a protrusion 147 and a groove 148, which are configured, for example, peripherally on the disc 142. The teeth 147, 148 can also be trapezoidal or wavy.

A further measure for obtaining torsional rigidity is for additional elements, in addition to the bearing bolts 144, to be employed according to the tube/rod principle and tensioned accordingly. In order to give the annular discs 142 maximum stability at the lowest possible weight, embossed patterns/lines etc. can be pressed in over the area.

Furthermore, the support of the outer rotary part 14 should only be large enough for swiveling or adjustment of the second bearing and guiding module 12 to be possible and for an annular connecting segment for an output drive gear wheel to be realisable.

Moreover, the cylinder formed by the outer rotary part 14 can have holes on its shell surface to reduce weight, so that a type of grid structure is formed. An extremely high torsion stability/flexural strength is thus achieved at a low component weight. According to a third example the outer rotary part 14 is modified as shown in FIG. 7 and FIG. 8 and described in the following. The continuously variable transmission 10 is otherwise constructed as in the second example.

In the present example instead of the discs 142 of FIG. 4 to FIG. 6, two casings 150, 151 are fixed to one another. In particular, the two casings 150, 151 are screwed to one another. However, other suitable types of fixing are also conceivable.

Furthermore, in the present example in the outer rotary part 14 at least some of the bearing bolts 144 from FIG. 5 and FIG. 6 are formed from two parts, namely tube 144A and rod 144B. In FIG. 7 and FIG. 8 the tube 144A and the rod 144B are tensioned against one another with the casings 150, 151 such that maximum strength is achieved, as already mentioned above with respect to FIG. 4 to FIG. 6. Flexing of the bearing bolts 144 is greatly minimised. The bearing bolt 144 can thus be produced on the one hand from a tube 144A, which forms the bearing position, and on the other hand from a rod 144B with a thread and head. The length of one of the tubes 144A defines the separation of the casings 150, 151 and therefore the size of the outer rotary part 14. If, for example, a screw as a rod 144B is pushed through the hole of the tube 144A and the one casing 151, for example, such that it projects at the other end of the tube 144A with its thread into the threaded hole of the other casing 150, the tube 144A can be screwed very tight with the casings 150, 151, that is to say the tube 144A is stressed under pressure the screw, which is formed a rod 144B, under tension. This is a tensioned construction which promises high stability and is very favourable in production. The bearing position, that is to say the tube 144A, would be effectively secured against unintentional twisting by the tensioned join.

This tube/rod fixing described can be employed not only with respect to the casings 150, 151 but also in the case of the discs 142 of FIG. 4 to FIG. 6.

According to a fourth example the annular bars 141 extend outwards beyond the shell plane of the outer rotary part 14. The hearing bolts 144 for the outer rotary part 14 here can be arranged as hitherto, but also on the outside of the outer rotary part 14. In this case the shell plane of the outer rotary part 14 is perforated at the corresponding points in order to create space for the coupling mechanisms 18. The bearing bolts 144 must be secured against unintentional twisting, so that it is ensured that the bearing pairing of the coupling mechanism 18 is called on. The continuously variable transmission 10 is otherwise constructed as in the first example.

As shown in FIG. 9 and FIG. 10 in a transverse and longitudinal section, according to a fifth example the inner rotary part 13 is produced from one or more metal sheets 131, 132 in a wound construction with high performance adhesives and optionally with tensile stress. A hollow space 133 thus forms in the middle of the inner rotary part 13. The wound construction can also be laminated in composite technology with various materials of steel/carbon. A closing pipe 134 can be pushed over this composite construction and glued in order to give a suitable surface to the sprags/ bearings, described later, for the coupling mechanism 18.

According to FIG. 9 the composite construction in a spiral construction forms a wavy part as the inner rotary part 13. In FIG. 9 the spiral is shown as an open spiral for better illustration since an intermediate space is present in each case between the metal sheets 131, 132. In reality, however, in the inner rotary part 13 the metal sheets 131, 132 are wound layer on layer, so that no intermediate space is present between the metal sheets 131, 132.

An alternative to the production of parts from steel by means of the milling/turning technique is thus presented here, a construction using composite materials and the laminating technique thereof being described. For example, steel sheets which are rippled or wavy at right angles to the winding direction can be used. The metal sheets 131, 132 can be loaded with a particular tensile stress in the winding direction here.

Furthermore, during the winding operation a liquid laminating adhesive can be introduced between the layers. The most diverse materials of glass/carbon fibres can also be co-laminated in. When the winding operation has ended and the laminate has set, the pretensioning of the winding technique can be removed and the blank can be pushed into a steel tube with laminating resin, allowed to set and then baked to the final strength in an oven. The tube 134 here would have the task e.g. for the inner rotary part 13 of forming a highly tempered running surface for the clutches of an inner coupling module described in the following. The advantage of this technique is to ensure the comparable strength of the structural elements with a higher elasticity and a lower specific weight than, for example, high-alloy steel.

The coupling mechanism 18 can be guided axially on the inner rotary part 13 or between the bearing plates of the housing 19. All the coupling mechanisms 18 consequently are adjacent axially to their neighbour at their end to the inner rotary part 13, so that only the coupling mechanisms 18 furthest removed must be guided axially at their end to the inner rotary part 13. At their end to the outer rotary part 14 the coupling mechanisms 18 do not have to be guided axially in the support in the outer rotary part 14. However, the coupling mechanisms 18 can be guided axially in the support in the outer rotary part 14.

FIG. 11 and FIG. 12 show diagrams of the construction of the coupling mechanisms 18 according to a sixth example. The coupling mechanism 18 comprises an outer coupling module 180, an inner coupling module 181, an outer bearing 182 for the outer coupling module 180, and a bearing 183 which serves as an inner bearing for the outer coupling module 180 and as an outer bearing for the inner coupling module 181. The outer and inner coupling module 180, 181 are pivotable with respect to one another by an angle α, as shown by a rotary arrow. The coupling mechanism 18 here is configured such that for the angle α is <180°, as shown in FIG. 11. By this means the coupling mechanism 18 cannot fold over in the direction of an arrow 184 into the state shown in FIG. 12. FIG. 11 here shows the state of maximum eccentricity of the coupling mechanism 18. In contrast, the state of FIG. 12 is an inadmissible state.

In order to achieve such a coupling mechanism 18, according to a first variant the eccentricity of the coupling mechanism 18 can be limited with the adjustment device, in accordance with the adjusting element 15 and/or adjustment drive device 20, or between the housing 19 and second bearing and guiding module 12, with "stops". Alternatively or in addition, according to a second variant stops for the coupling mechanism 18 can also be formed in the articulated axes of at least one of the outer and inner bearings 182, 183, 184, 185. However, the former variant is preferred, since an undefined operating state can form in the second variant. Possibilities for articulated stops for the inner and outer coupling modules 181, 180 are:
   outer coupling module 180 through articulated axis or bearing 182 stops at the outer rotary part 14,
   inner and outer coupling module 181, 180 have stops in the vicinity of the articulated axis or bearing 183 such that the angle α in FIG. 11 cannot become greater.

In addition a combination of the abovementioned possibilities for the articulated stops is possible.

As described above, the coupling mechanisms 18 are arranged on the rotary parts 13, 14 via sprags. The sprags can be produced entirely from hard metal, e.g. tungsten, silicon carbide etc.

Furthermore, a clutch of the coupling mechanisms 18 can be constructed as a disc brake which can be controlled externally. The implementing of an additional coupling mechanism 18 per coupling unit renders possible a forced control of the braking device resulting from the kinematics. The control, such as opening and closing of the brake, must take place in advance of the coupling mechanism 18 in question.

FIG. 13 shows a diagram of the construction of the coupling mechanisms 18 according to a seventh example. The coupling mechanism 18 here comprises cranked bearing bolts 182A, 182B and 183A, 183B. Consequently, the outer bearing 182 for the outer coupling module 180 comprises the two parts 182A, 182B, the other bearing 183, which serves as an inner bearing 184 for the outer coupling module 180 and as an outer bearing 185 for the inner coupling module 181, comprises the two parts 183A, 183B. The inner and outer coupling modules 181, 180 therefore do not move around one pivotal point, as in FIG. 11 and FIG. 12, but around two pivotal points. The angle α here is in each case constant in the parts 182B, 183B. By this means also the coupling mechanism 18 cannot fold over into an inadmissible state. The sense and purpose of the coupling mechanism 18 shown in FIG. 13 is to deform the sinus function of a movement of a coupling mechanism 18 such that the ideal of a rectangular function is approached, with the aim of maintaining the rotary movement uniformly at the output drive.

FIG. 14 and FIG. 15 show two views of an inner coupling module 181 in lightweight construction according to an eighth example. As illustrated in FIG. 14, the inner coupling module 181 has the form of a double cam. The inner coupling module 181 is configured symmetrically to the dot-dash central line. At an internal opening 181A the inner coupling module 181 has a running surface 181B for a sprag set or a support.

FIG. 15 shows in a side view that the inner coupling module 181 is not a solid part, but has several slots 181C. The slots 181C can be produced, for example, by correspondingly screwing in the inner coupling module 181 radially to the inner opening. The inner coupling module 181 can also be constructed in disc form in order to produce the slots 181C.

As shown in FIG. 16 in a section A-A of FIG. 14, carbon fibres 181D can be wound with lamination under pretension into the slots 181C. However, the carbon fibres are not necessarily to be provided. Furthermore, a mass balancing bolt 180A can be provided on the inner coupling module 181, which can balance the mass of a bearing bolt 181E of the outer coupling module 180. By this means the mass is exactly the same on both sides of the dot-dash central line in FIG. 16. The bearing bolt 181E belongs gravimetrically to the inner coupling module 181 and is guided in a bearing casing 181F. The opposite mass balancing bolt 180A represents the exact counter-weight over the symmetry plane/

Overall, by the measures shown in FIG. 15 and also FIG. 16 in the present example a significant weight reduction results in the inner coupling module 181 compared with a solid component. Moreover, the inner coupling module 181 can very advantageously be balanced by the mass balancing bolt 180A.

Furthermore, according to this example the outer coupling module 180 can be constructed as illustrated in FIG. 17 in a section view and in FIG. 18 in a side view. The outer coupling module 180 is connected rotatably/pivotably, similarly to a knee joint, to the inner coupling module 181 with the bearing bolt 181E of the inner coupling module 181 via openings 180D of the outer coupling module 180, as can also be seen from FIG. 16. The outer coupling module 180 is preferably constructed such that its weight in the region L1 is equal to its weight in the region L2. The line between L1 and L2 preferably goes exactly through the bearing central point. Furthermore, in the outer coupling module 180 a central bar 180B connects two arms 180C, which demarcate the outer coupling module 180 on two opposite sides. Profiles of the outer coupling module 180, such as, for example, its central bar 180B and/or its arm(s) 180C, can also be, for example, tubular, double T-shaped etc.

The outer coupling module 180 is thus also very advantageously balanced by the mass distribution described.

With the outer and inner coupling module 180, 181 described above a complete mass balancing of the inner and outer coupling module can be ensured. As a result the rotating coupling functional elements can perform the high rotational speeds required for the continuously variable transmission 10.

The outer coupling module 180 can be produced by the deep-drawing and/or sheet metal pressing technique. If no chambers are formed by annular rings in the outer rotary part 14, the outer coupling module 180 is therefore not tapered, it then has a rectangular base shape in plan view.

In the outer coupling module 180 in the cheeks or arms 180C oil feed bores which realise the lubricant feed to the bearing positions of the bolt 181E of the inner coupling module 181 can be provided radially in recesses, such as, in particular, grooves etc. around a bearing bore 180D. Radial openings, in particular through bores, can furthermore be arranged in the bearing easing 181F of the bearing bolt 181E of the inner coupling module 181. The outer coupling module 180 can also be guided axially on the bearing bolt 29 (FIG. 3) itself instead of in a chamber of the outer rotary part 14. An axial guiding of the inner coupling modules 181 on the inner rotary part 13 is not absolutely necessary.

Since the clutch elements (sprags) must also be capable of transferring energy, FIG. 19 to FIG. 22 indicate advantageous embodiment variants for this.

FIG. 19 shows a lower foot region of the sprag element 31A lying on the inner rotary part 13. The lower foot region of the sprag element 31A is concave in shape, whereas the inner rotary part 13 is convex in shape. Here, the radius of the concave curvature of the lower foot region of the sprag element 31 is greater than the radius of the convex curvature of the inner rotary part 13.

In the embodiment variant of FIG. 20, on the other hand, the lower foot region of a sprag element 31B is spherical in shape. The lower foot region of the sprag element 31B and the inner rotary part 13 are thus convex in shape here. In this embodiment variant only a slight linear contact is thus present from the lower foot region of the sprag element 31B and the inner rotary part 13. In the embodiment variant of FIG. 20 the contact area of sprag element 31B and inner rotary part 13 is therefore subject to a greater wear than in the embodiment variant of FIG. 19.

In FIG. 21 and FIG. 22 reaching of high rotational speeds is achieved by individual spring mounting of the sprag elements 34. In addition or alternatively, reaching of high rotational speeds can be achieved caused by centrifugal force or flinging force, for example, by sprag geometry, centre of gravity, pressing in an annular gap, as illustrated in FIG. 21 and FIG. 22. Furthermore, as already mentioned above the inner and outer coupling module 181, 180 and the outer rotary part 14 should be as light and strong as possible.

FIG. 21 shows a spring 33 which presses a sprag 34 with a shank 34A in the direction of the arrows 35. The spring 33, which can press the sprag 34 into the desired position, can be supported on a cage 39 which receives the sprag 34. As a result the sprag 34 is pressed into an annular gap 36 between, for example, the inner rotary part 13 and the inner coupling module 181. During power transmission the power transmission arises via the lowering action. The range of the shank 34A leads to the centrifugal force, in addition to the force of the spring 33, pressing the sprag 34 into the annular gap 36. FIG. 21 moreover shows the arrangement of the sprag 34 with respect to the input drive direction 40 and the output drive direction 50.

In FIG. 22 one end of the sprag 34 is arranged with holding elements 37 in a sprag shoe 38. The spring 33 here is formed in an S-shape. With this variant the surface area of the sprag 34 can be increased in order to reduce wear. The end of the sprag 34 on the sprag shoe 38 has a radius either smaller than or equal to the radius of the corresponding receiver for the end of the sprag 34 in the sprag shoe 38.

Since the outer coupling module 180 of the continuously variable transmission 10 can perform three-dimensional movements, the functional components for the radial support are also to be supported axially. Several possibilities for this are described in the following.

FIG. 23 to FIG. 26 each show different variants for an axial securing of a bolt or a shaft 50 on a plate-shaped element 51, such as, for example, a disc 142. Such an axial securing can be employed, for example, for the bearing bolts 180A and/or also for the inner rotary part 13 etc.

Figure 23:
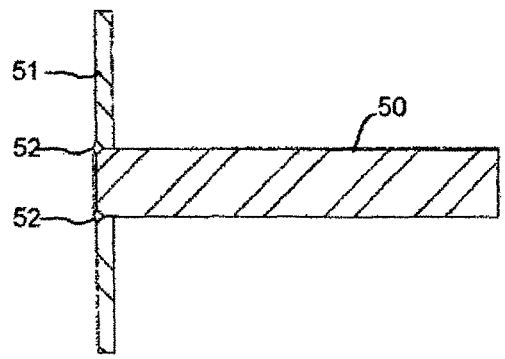

According to the variant of FIG. 23 the shaft 50 and the disc 51 are fixed to one another by means of a welded joint 52 in the form of, for example, weld points, a weld seam etc.

Figure 24:
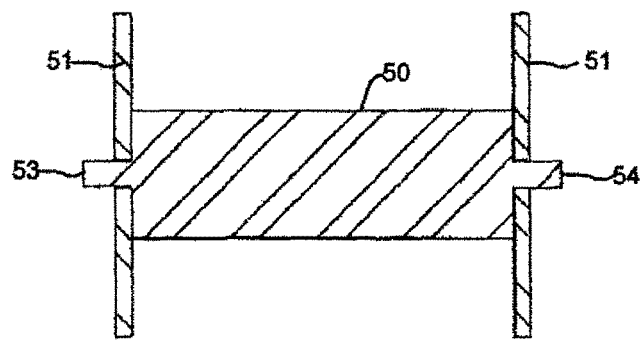

According to the variant of FIG. 24 the shaft 50 has on its one end a peg 53 and on its other end a peg 54. The pegs 53, 54 are each twisted into an opening of a disc 51. The peg 53 here has a right-hand thread. The peg 54 has a left-hand thread.

Figure 25:
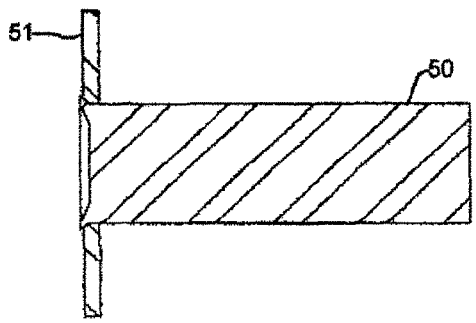

According to the variant of FIG. 25 the shaft 50 is arranged in an opening of the disc 51 and pressed therein. For this, in particular, the circumference of the shaft can be somewhat larger than the diameter of the opening of the disc 51.

Figure 26:
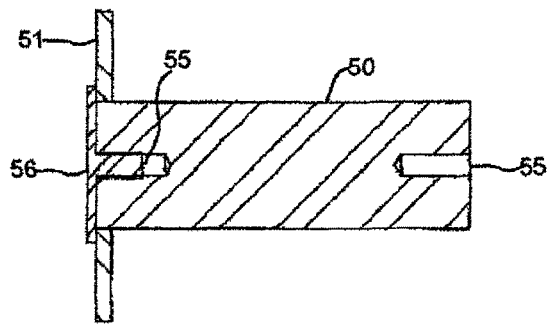

According to the variant of FIG. 26 the shaft 50 has on each of its two ends an opening 55. A plate screw 56 can be screwed into each of the openings 55, as shown on the left-hand side in FIG. 26.

FIG. 27 to FIG. 30 each show various variants for securing against twisting of a bolt or a shaft on a plate-shaped element 51 such as, for example, a disc 142 (FIG. 5 and FIG. 6). Such a radial securing against twisting can be employed, for example, for the inner rotary part 13 or the bearing bolts 180A etc. The radial securing against twisting can be combined with the axial securing according to FIG. 19 to FIG. 22.

Figure 27:
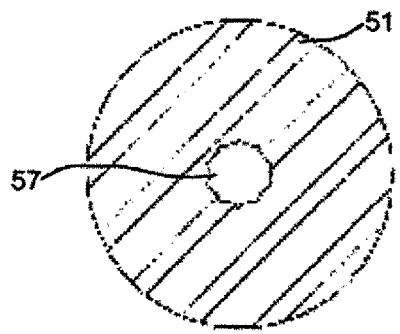

According to the variant of FIG. 27 in the disc 51 teeth 57 are provided in an opening of the disc 51. If the shaft is toothed correspondingly, it can engage with the disc 51 and in this way be secured against twisting with respect to the disc 51.

Figure 28:
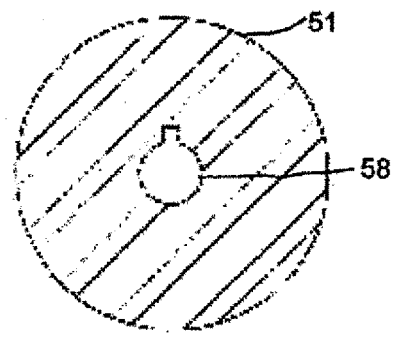

According to the variant of FIG. 28 the opening 58 is configured to fit a splined shaft.

Figure 29:
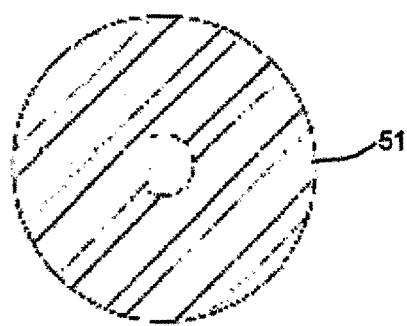

According to the variant of FIG. 29 the opening 59 is flattened, the shaft being configured accordingly.

Figure 30:
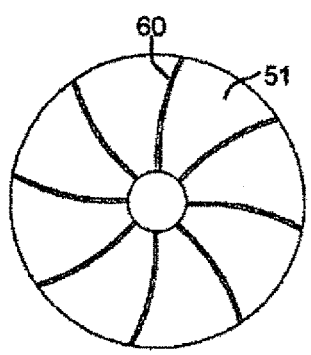
Figure 31:
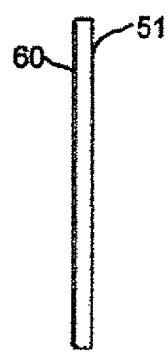

According to the variant of FIG. 30 and FIG. 31 the disc 51 has on its surface in the radial direction of the disc 51 axial raised parts 60, not all of which are provided with reference symbols in FIG. 30. The raised parts 60 protrude out of the disc to a predetermined extent, as illustrated in FIG. 31.

FIG. 32 shows a preferred embodiment of a lubricant supply of the continuously variable transmission 10. This provides a forced lubricant supply between the inner rotary part 13 and the coupling mechanisms 18, particularly preferably between the inner rotary part 13 and the inner coupling module(s), by means of a pump. A lubricant stream in the axial direction along the shell surface of the inner rotary part 13 exists here. In addition, a first guiding channel 194 is provided within the bearing and guiding module 11, preferably within the bearing plate 112 of the inner rotary part 13, to the bearing position of the inner rotary part, through which the lubricant is introduced via a first guiding casing 196, that it to say an interface of the stationary part (such as the housing) to the rotatable part (inner coupling module 181), to the shell surface of the inner rotary part 13. Particularly preferably, this region is given by the annular gap of the inner rotary part 13 and the bore of the coupling mechanism 18, preferably of the inner coupling module 181. The lubricant is now delivered in an axial direction along the inner rotary part 13. Between the coupling mechanisms 18 arranged in series in the axial direction of the inner rotary part 13 a defined lubricant loss can advantageously be intended, which preferably supplies the axial support and/or the internal machine element with lubricant by centrifugal force. Furthermore, preferably a second guiding channel within the other bearing and guiding module, preferably within the other bearing plate of the inner rotary part 13, and particularly preferably a second guiding casing as an interface of the stationary part to the rotatable part are provided, which particularly preferably compared with the first guiding channel and the first guiding casing is at the opposite end, in the axial direction, of the inner rotary part 13. The second guiding channel is advantageously provided so that the exiting lubricant can flow in the corresponding bearing of the housing. Through the second guiding channel 198, the return flow of the lubricant is provided or the lubricant is sucked up. The lubricant stream along the shell surface of the inner rotary part 13 is limited at both ends of the inner rotary part 13 by in each case a shaft sealing ring 136. Preferably, a lubricant stream is thus provided only in the region of the inner rotary part 13 which is in the housing 19.

Preferably, on the axial support of a coupling mechanism 18 an annular bar can be mounted enclosing this, which projects into a groove of an adjacent coupling mechanism 18.

In a particularly preferred embodiment of the lubricant supply of the continuously variable transmission 10 rings which run into one another and are slightly spaced are employed on the coupling mechanisms 18, or hydraulic seals or mechanical seals are provided.

In a further preferred embodiment of the lubricant supply overlapping sealing rings 138 are provided between in each case two coupling mechanisms 18 adjacent in the axial direction, which seal off possible intermediate spaces between the adjacent coupling mechanisms 18 from the lubricant stream on the shell surface of the inner rotary part 13. Particularly preferably, the thickness of these sealing rings 138 tapers in the direction of the lubricant stream.

Any desired combinations between the so-called leakproof lubricant supply, in which no substantial loss of lubricant, for example by exit of the lubricant for lubrication of the internal machine elements and/or the coupling mechanism 18, occurs, and a lubricant supply with loss of lubricant are also conceivable. Such a combination could be, for example, the arrangement of sealing rings 138 between only some coupling mechanisms, but not between all coupling mechanisms.

Advantageously, by the in these preferred embodiments of the lubricant supply no nozzles positioned in a stationary manner in the internal machine element or simultaneously rotating nozzles are necessary. However, stationary nozzles could also be provided instead and/or in addition.

Advantageously, a fine filter element is furthermore provided in the suction line of the pump which ensures the lubricant stream of the lubricant supply.

Moreover, depending on the vertical or horizontal alignment of the continuously variable transmission, that is to say depending on whether the axial direction of the inner rotary part 13 is aligned vertically or horizontally during start-up of the continuously variable transmission, corresponding bores are provided for the pump, for sucking up the lubricant, on the container in which the lubricant collects, in particular, during operation of the pump. The bores here are preferably always on the lubricant line of the lower part of the continuously variable transmission, in which the lubricant collects due to gravity.

FIG. 33 shows a diagram of a section view of a preferred embodiment of a part of the continuously variable transmission 10 to illustrate a variant for a lubricant supply having a first lubricant guiding device 220 and a second lubricant guiding device 230. The figure shows a part of the inner rotary part 13, on which via bearing elements 228, which can preferably be annular in configuration and which particularly preferably are roller bearings and/or sliding bearings, and via a sprag or a row of sprags 234 a coupling mechanism 18 or the inner coupling module 181 of the coupling mechanism 18 is supported or coupled. As described in FIG.

32, a lubricant supply is preferably provided along the shell surface of the inner rotary part 13. Sealing elements 139, which likewise are preferably configured as sealing rings, are therefore provided, which seal off from the inner space 240 of the outer rotary part 11 with respect to a loss of lubricant the intermediate space which . . . between the inner rotary part 13 and two regions 1812 of adjacent inner coupling modules 181 of two coupling mechanisms 18, which each preferably enclose the inner rotary part 13 over the complete circumference and particularly preferably are annular in construction.

The reference symbol 183 identifies the first bearing position or the inner coupling bearing of the coupling mechanism 18 at which the inner coupling module 181 is supported on the outer coupling module 180. The reference symbol 182 identifies the second bearing position or the outer coupling bearing 182 of the coupling mechanism 18 at which the coupling mechanism 18 or the outer coupling module 180 of the coupling mechanism 18 is supported via bearing elements 228, which are preferably annular in configuration, on a bearing bolt 29 of the outer rotary part 14.

FIG. 33 moreover shows a first lubricant guiding device 220. This is suitable and provided for delivering, by at least partial action of the centrifugal force during operation of the continuously variable transmission 10, lubricant from the lubricant flow which prevails on the shell surface of the inner rotary part 13 and enters via the region in which the sprag or a row of sprags 234 is also arranged, via the receiving opening 222, in the direction of the first bearing position 183. There, the lubricant can enter via the removal opening 224 into the inner coupling bearing and supply this with lubricant. Moreover, sealing elements 226 are shown, which are preferably annular in construction and seal off the inner coupling bearing or the bearing elements 228 of this from the interior of the outer rotary part with respect to a loss of lubricant.

From the first bearing position 183 lubricant is now to be delivered in turn, accelerated at least partially by the centrifugal force during operation of the continuously variable transmission 10, to the second bearing position or the outer coupling bearing via the second lubricant guiding device 230.

Both the first lubricant guiding device 220 and the second lubricant guiding device 230 here in the embodiment shown are arranged completely within the coupling mechanism or are constructed as a bore of the inner coupling module 181 or as a bore of the outer coupling module 180. In this context the second lubricant guiding device 230 can be guided through a sealing element 226.

FIG. 34 shows a diagram of a gear lubricant pump 300. In this context, preferably either one gear wheel 310 or gear wheel 320 used for this or also particularly preferably both gear wheels 310, 320 used for this, a gear wheel or gear wheels of the continuously variable transmission, advantageously, for example, a crown gear of the outer rotary part and preferably as the second gear wheel a gear wheel which is employed on the output drive side of the continuously variable transmission in connection with the output drive shaft, can be provided. The teeth of the two gear wheels 310 and 320 shown are engaged here.

Reference symbol 330 identifies a device which completely encloses the engagement region 340 of the teeth of the two gear wheels 310 and 320, for example a housing. However, for this it is not necessary for the two gear wheels 310 and 320 themselves also to be completely enclosed. The device 330 preferably has a lubricant feed line 332, via which lubricant can be fed to the engagement region 340 of the teeth, and a lubricant removal line, via which lubricant can be removed from the engagement region 340 of the teeth. Particularly preferably, the lubricant feed line 332 is connected to the lubricant sump (suction side) and the lubricant removal line 334 is particularly preferably connected to the first guiding channel within the bearing and guiding module, via which lubricant can be provided to the pressure side of the lubricant supply. In the direction of rotation of the two gear wheels 310 and 320 illustrated by means of the two arrows, the suction side (lubricant feed line 332) here is given in the plane of the figure on the left of the engagement region 340 and the pressure side (lubricant removal line 334) is given in the plane of the figure on the right of the engagement region 340.

FIG. 35 shows a diagram of the arrangement and configuration of the inner and outer coupling module to illustrate the relative and absolute mass balancing of the moving coupling modules. The inner coupling module 181, which is rotatable around the inner rotary part 13, more precisely around the pivotal point D1, which preferably lies on the rotational axis of the inner rotary part 13, is shown here. The inner coupling module 181 is connected to the outer coupling module 180 via the inner coupling bearing 183 or the first bearing position 183. The outer coupling module here is rotatable around the pivotal point D2, which preferably lies on the outer rotary part 14.

In each case the preferred configurations both of the inner coupling module 181 and of the outer coupling module 180 as a two-sided lever are shown. The inner coupling module 181 here has a first lever arm L4 and a second lever arm L3. The outer coupling module 180 has a first lever arm L6 and a second lever arm L5. Preferably, the mass distributions of the two lever arms are selected here in each case such that the torques of the two lever sides are in equilibrium. The weight of the inner coupling bearing 183 here can be counted in terms of mass with the first lever arm L4 of the inner coupling module 181 or also the first lever arm L6 of the outer coupling module 180. It would also be conceivable to count only a part of the weight, for example the half, with the first lever arm L4 of the inner coupling module 181 and the other part with the first lever arm L6 of the outer coupling module 180. The reference symbols G1 and G2 each identify counter-weights which can be mounted on the second lever arms L3 and L5 in order to balance masses, for example the mass of the inner coupling bearing 183 or the bearing bolt and bearing bushing of this. An equilibrium of the torque is thus preferably achieved on both sides of the lever.

The reference symbol G3 identifies a further counter-weight. This balances the mass of the outer coupling module. Preferably, this is arranged diametrically opposite to the pivotal point D2 of the outer coupling module 180 (on the outer rotary part 14) and is particularly preferably just as heavy as the weight of the outer coupling module 180.

FIG. 36 shows a cross-section diagram of an embodiment of a continuously variable transmission. The outer rotary part 14 is shown here, which is incorporated via a rotary decoupling 410, for example a thin ring bearing, in a housing 19, the pivoting housing. The outer rotary part 14 can rotate around the centre of rotation R2 and is moreover pivotable together with the pivoting housing 19 around the pivoting point 420, which is supported in a fixed position, along the pivoting direction illustrated by the arrow P1.

The inner rotary part 13, on the other hand, is preferably supported in a fixed position but rotatably around the centre of rotation R1 of the inner rotary part 13. The inner coupling module 181 of a coupling mechanism 18 can be coupled via a clutch 430 to the inner rotary part 13, although it can also be free-running around the inner rotary part 13. The inner coupling module 181 is supported (rotatably) via the inner coupling bearing 183, which is called the first bearing position, on the outer coupling module 180. This support can be realised via a bearing bolt. The outer coupling module 180 finally is arranged or supported via the outer coupling bearing 182 (second bearing position), preferably via a bearing bolt, on the outer rotary part 14.

FIG. 37 finally shows a conversion of a rotary movement of the outer rotary part 14 via a planetary transmission 440 into a rotary movement of an output drive shaft of the continuously variable transmission. The planetary transmission 440 here has a sun wheel 444, planet wheels 446 and a ring gear 442. The output drive shaft is preferably arranged on the planet carrier 448 on which the planetary wheels 446 are arranged.

A further gear wheel 445, which preferably has a larger diameter than the sun wheel, is preferably arranged in a fixed manner (mechanically connected) on the sun wheel, this gear wheel 445 being engaged with teeth of the outer rotary part 14. The ring gear 442 has inner teeth which are engaged with the planet wheels 446. The ring gear is preferably driven via a toothed belt 450, V-belt 450, a chain 450, toothed chain 450, which transfers the rotary movement of the outer rotary part to the ring gear.

All the configurations of the continuously variable transmission 10 described above can be used individually or in all possible combinations. In particular, the features of the examples described above can be combined as desired or if required omitted. In addition, the following modifications in particular are conceivable.

The parts shown in the figures are in diagram form and can deviate in precise configuration from the forms shown in the figures, as long as the functions thereof described above are ensured.

The inner rotary part 13 can be used as an input drive or output drive. The outer rotary part 14 consequently can also be used as an output drive or input drive.

For each part of the continuously variable transmission 10 there is the possibility of employing all types of steels, coatings, hard metals, composite materials, carbon-glass fibres etc.

The applicant reserves the right to claim all the features disclosed in the application documents as essential to the invention if individually or in combination they are novel with respect to the prior art. It is furthermore pointed out that features which in themselves may be advantageous have also been described in the individual figures. The person skilled in the art can see directly that a particular feature described in a figure may also be advantageous without adopting further features from this figure. The person skilled in the art can furthermore see that advantages may result by a combination of several features shown in individual or in different figures.

The invention claimed is:

1. A continuously variable transmission (10); comprising:
an outer rotary part (14),
an inner rotary part (13) which is arranged in the outer rotary part (14) such that the inner and/or the outer rotary part (13, 14) are rotatable relative to one another,
a plurality of coupling mechanisms (18) coupling the inner rotary part (13) and the outer rotary part (14),
an adjustment device for eccentric adjustment of the inner and outer rotary part (13, relative to one another, and having at least one first lubricant guiding device (220) for guiding at least some of a lubricant from the shell surface of the inner rotary part (13) radially outwards towards the outer rotary part (14) to a region of a coupling mechanism (18) lying radially further outwards with respect to the rotational axis of the inner rotary part (13); characterized in that:
a lubricant stream exists in the axial direction along the shell surface of the inner rotary part (13), by which a lubricant supply is provided between the inner rotary part (13) and the coupling mechanisms (18).

2. A continuously variable transmission (10) according to claim 1, wherein the continuously variable transmission (10) has a pump (30) for delivering a lubricant into the transmission (10) along a shell surface of the inner rotary part (13).

3. A continuously variable transmission (10) according to claim 1, wherein the continuously variable transmission (10) has sealing elements which are arranged on the inner rotary part (13) in the coupling mechanisms (18) for delivering a predetermined amount of lubricant to the particular coupling mechanism (18).

4. A continuously variable transmission (10) according to claim 2, wherein the continuously variable transmission (10) has nozzles which are arranged on the inner rotary part (13) in the coupling mechanisms (18) for delivering a predetermined amount of lubricant to the particular coupling mechanism (18).

5. A continuously variable transmission (10) according to claim 1, wherein the outer rotary part (14) has discs (142) or two casings (150, 151) fixed to one another, which are spaced apart by bearing bolts (144) for the coupling mechanisms (18).

6. A continuously variable transmission (10) according to claim 1, wherein one of the plurality of coupling mechanisms (18) further comprises:
an inner coupling module (181) which is arranged on the inner rotary part (13) and an outer coupling module (180) which is arranged on the outer rotary part (14), wherein the outer and inner coupling module (180, 181) are pivotable around an angle relative to one another, with such angle being smaller than 180°.

7. A continuously variable transmission (10) according to claim 6, characterized in that
the inner coupling module (181) has a mass balancing bolt (180A) for balancing a mass of a bearing bolt (181E) of at least one coupling module (180, 181), with which bearing bolt (1801E) the inner and outer coupling module (181, 180) can be fixed to one another by a fixation selected from the group of fixations selected from the fixations rotatably, pivotably and combinations of both.

8. A continuously variable transmission (10) according to claim 1, wherein the inner coupling mechanism has at least one slot for receiving carbon fibers (181D) wound by lamination with pretension.

9. A continuously variable transmission (10) according to claim 1, wherein a lower end of a sprag element (31A) is concave in construction, the sprag (31A) serving to support one of the coupling mechanisms (18) on the inner rotary part (13).

10. A continuously variable transmission (10) according to claim 1, wherein a bearing position (21) for an adjusting element (15) of the adjustment device is arranged in the axial direction centrally on a bearing and guiding module (12), which serves to support the outer rotary part (14).

11. A continuously variable transmission (10) according to claim 1, characterized in that an eccentricity of the outer rotary part (14) relative to the inner rotary part (13) is limited with the adjustment device with stops and/or an eccentricity of the coupling mechanism (18) between a housing (19) and a bearing and guiding module (12) which serves to support the outer rotary part (14) is limited by stops.

\* \* \* \* \*